US011521490B2

(12) United States Patent
Chano et al.

(10) Patent No.: US 11,521,490 B2
(45) Date of Patent: Dec. 6, 2022

(54) SEMICONDUCTOR DEVICE, RADIO TERMINAL DEVICE, AND COMMUNICATION METHOD OF RADIO TERMINAL DEVICE

(71) Applicant: RENESAS ELECTRONICS CORPORATION, Tokyo (JP)

(72) Inventors: Hiroshi Chano, Tokyo (JP); Suguru Fujita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 392 days.

(21) Appl. No.: 16/817,198

(22) Filed: Mar. 12, 2020

(65) Prior Publication Data

US 2020/0294395 A1 Sep. 17, 2020

(30) Foreign Application Priority Data

Mar. 15, 2019 (JP) .............................. JP2019-049148

(51) Int. Cl.
| | | |
|---|---|---|
| *G08G 1/07* | (2006.01) | |
| *G08G 1/01* | (2006.01) | |
| *H04W 4/80* | (2018.01) | |
| *H04W 4/48* | (2018.01) | |
| *G08G 1/133* | (2006.01) | |
| *H04W 4/46* | (2018.01) | |

(52) U.S. Cl.
CPC .............. *G08G 1/07* (2013.01); *G08G 1/0112* (2013.01); *G08G 1/133* (2013.01); *H04W 4/46* (2018.02); *H04W 4/48* (2018.02); *H04W 4/80* (2018.02)

(58) Field of Classification Search
CPC ............ H04W 4/40; H04W 4/46; H04W 4/44
See application file for complete search history.

(56) References Cited

U.S. PATENT DOCUMENTS

| 8,705,561 | B2 | 4/2014 | Ito et al. |
| 10,869,276 | B1* | 12/2020 | Lekutai ................... H04W 4/44 |
| 2009/0296680 | A1* | 12/2009 | Suzuki ............. H04W 72/0406 370/310 |

(Continued)

FOREIGN PATENT DOCUMENTS

JP 2010-124330 A 6/2010

*Primary Examiner* — Romani Ohri
(74) *Attorney, Agent, or Firm* — McDermott Will & Emery LLP

(57) ABSTRACT

A semiconductor device includes a transmission control unit which performs transmission processing, an area determination unit which determines whether an own vehicle is located in an intersection area, and an operation mode determination unit which determines either a control mode or a terminal mode as an operation mode of a radio terminal device based on an identification information for identifying a source of a received communication frame, and a determination result by the area determination unit. When the operation mode is determined to be the control mode, the transmission control unit outputs, as transmission data, a communication frame including generated control information. When the operation mode is determined to be the terminal mode, the transmission control unit outputs transmission data in synchronization with the received communication frame.

20 Claims, 12 Drawing Sheets

(56) References Cited

U.S. PATENT DOCUMENTS

| | | | |
|---|---|---|---|
| 2013/0033386 A1* | 2/2013 | Zlojutro | G08G 1/127 |
| | | | 340/935 |
| 2018/0338001 A1* | 11/2018 | Pereira Cabral | H04L 67/141 |
| 2020/0072963 A1* | 3/2020 | Yu | G01S 7/006 |
| 2020/0305167 A1* | 9/2020 | Freda | H04W 4/40 |
| 2022/0053385 A1* | 2/2022 | Li | H04W 36/08 |
| 2022/0078839 A1* | 3/2022 | Yoshioka | H04W 72/1268 |

* cited by examiner

SEMICONDUCTOR DEVICE, RADIO TERMINAL DEVICE, AND COMMUNICATION METHOD OF RADIO TERMINAL DEVICE

CROSS-REFERENCE TO RELATED APPLICATIONS

The disclosure of Japanese Patent Application No. 2019-049148 filed on Mar. 15, 2019 including the specification, drawings and abstract is incorporated herein by reference in its entirety.

BACKGROUND

The present disclosure relates to a semiconductor device, a radio terminal device and a communication method of the radio terminal device.

A Vehicle to X (V2X) radio communication system is a radio communication system that supports safe driving of a driver for the purpose of traffic safety, accident prevention, traffic congestion alleviation, and the like. The V2X wireless communication system includes a radio control device (base station) and a radio terminal device (in-vehicle device). Road-to-vehicle communication is performed between the radio control device and the radio terminal device. In the road-to-vehicle communication, the radio control device notifies the radio terminal device of information for surrounding communication control and highly reliable surrounding information. On the other hand, vehicle-to-vehicle communication is performed between the radio terminal devices. In the vehicle-to-vehicle communication, the radio terminal devices exchange vehicle speed information, vehicle position information, and the like of its own vehicle and other vehicle.

There are disclosed techniques listed below.
[Patent Document 1] Japanese Unexamined Patent Application Publication No. 2010-124330.

Patent Document 1 discloses a radio communication system that includes an access control device (radio control device) and a terminal device (radio terminal device). The radio control device according to Patent Document 1 is installed at an intersection, and transmits a frame for use in data communication with the radio terminal device. The radio terminal device according to Patent Document 1 transmits data in synchronization with a received frame.

SUMMARY

As described in Patent Document 1, the radio control device in the V2X radio communication system is installed at an intersection where there is a high-risk of traffic accidents. However, since there are an infinite number of intersections, it is difficult to assume that the radio control devices are installed at all intersections. At an intersection where the radio control device is not installed, only the vehicle-to-vehicle communication is performed. In the vehicle-to-vehicle communication, the radio terminal device of each vehicle includes a timer that operates as a free-run counter, and each of the radio terminal devices independently determines a transmission timing based on a count value of the timer. The radio terminal device of each vehicle transmits data including a count value of the timer when transmitting the data to other vehicle, but the timers do not operate synchronously between the vehicles. Therefore, the radio terminal device of each vehicle cannot grasp a transmission timing of data received from the radio terminal device of other vehicle.

Other objects and new features will be apparent from the description of this specification and the accompanying drawings.

A semiconductor device according to one embodiment is a semiconductor device for controlling a radio terminal device mounted on a first vehicle, and includes a communication unit which receives a first communication frame to generate reception data, and transmits transmission data, a reception control unit which extracts first control information from the reception data, the first control information including identification information for identifying a radio communication device transmitting the first communication frame, a transmission control unit which outputs the transmission data to the communication unit, a first area determination unit which determines whether the first vehicle is located in an intersection area, and an operation mode determination unit which determines either a control mode or a terminal mode as an operation mode of the radio terminal device based on the identification information and a determination result by the first area determination unit. When the operation mode of the radio terminal device is determined to be the control mode, the transmission control unit outputs, as the transmission data, a second communication frame including second control information to the communication unit. When the operation mode of the radio terminal device is determined to be the terminal mode, the transmission control unit outputs the transmission data to the communication unit in synchronization with the first communication frame including the first control information.

A semiconductor device according to another embodiment is a semiconductor device for controlling a radio terminal device mounted on a first vehicle, and includes a communication unit which receives a first communication frame to generate reception data, and transmit transmission data, a reception control unit which extracts first control information from the reception data, the first control information including identification information for identifying a radio communication device transmitting the first communication frame, a first area determination unit which determines whether the first vehicle is located in an intersection area, an operation mode determination unit which determines either a control mode or a terminal mode as an operation mode of the radio terminal device based on the identification information and a determination result by the first area determination unit, and a transmission control unit which performs first transmission processing or second transmission processing in accordance with the operation mode of the radio terminal device. When the operation mode of the radio terminal device is determined to be the control mode, the transmission control unit performs the first transmission processing of outputting, as the transmission data, a second communication frame including second control information to the communication unit. When the operation mode of the radio terminal device is determined to be the terminal mode, the transmission control unit performs the second transmission processing of outputting the transmission data to the communication unit in synchronization with the first communication frame including the first control information.

A communication method according to yet another embodiment is a communication method of a radio terminal device mounted on a first vehicle, and includes receiving a first communication frame via an antenna, generating reception data from the first communication frame, storing the reception data in a storage unit, extracting first control information from the reception data, the first control information including identification information for identifying a radio communication device transmitting the first communication frame, acquiring position information of the first vehicle via a global positioning system module, determining whether the first vehicle is located in an intersection area based on the position information of the first vehicle and map information, confirming the identification information, determining either a control mode or a terminal mode as an operation mode of the radio terminal device mounted on the first vehicle based on the identification information and a result determined by the determining, and transmitting transmission data. The transmitting includes outputting, as the transmission data, a second communication frame including second control information when the operation mode of the radio terminal device mounted on the first vehicle is determined to be the control mode, and outputting the transmission data in synchronization with the first communication frame including the first control information when the operation mode of the radio terminal device mounted on the first vehicle is determined to be the terminal mode.

In the semiconductor device according to one embodiment, even at an intersection where a radio control device is not installed, radio communication can be performed by sharing a relative time of transmission data among radio terminal devices, and a transmission timing of data received from radio terminal device of other vehicle can be grasped.

DETAILED DESCRIPTION

Figure 1:
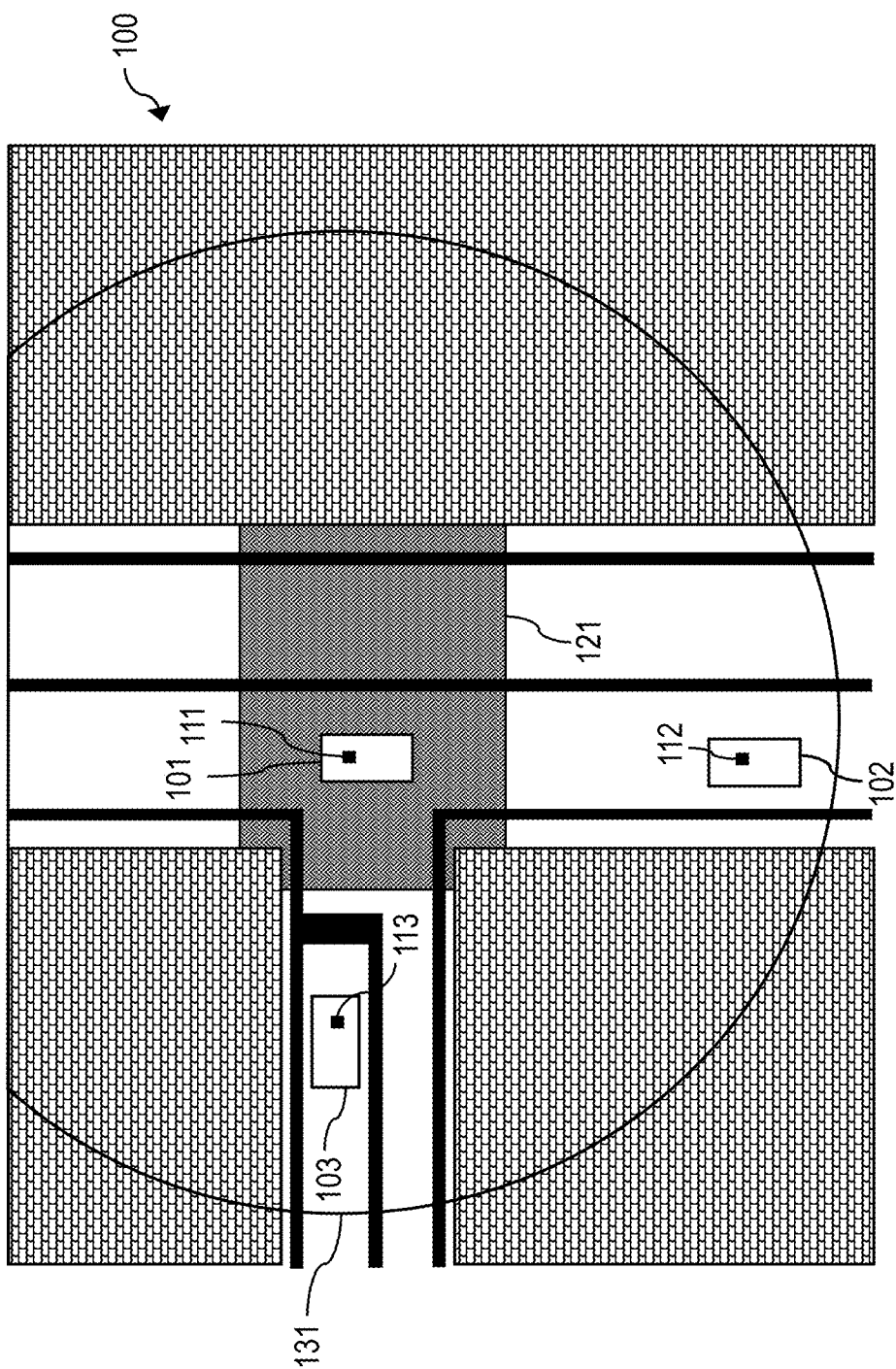
FIG. 1 is a diagram showing an example of a configuration of a radio communication system according to one embodiment.

Hereinafter, a semiconductor device according to one embodiment will be described in detail by referring to the drawings. In the specification and the drawings, the same or corresponding components are denoted by the same reference numerals, and a repetitive description thereof is omitted. In the drawings, for convenience of description, the configuration may be omitted or simplified. Also, each of the embodiments may be arbitrarily combined with at least some of the other embodiments.

First Embodiment

FIG. 1 is a diagram showing an example of a configuration of a radio communication system 100 according to a first embodiment. As shown in FIG. 1, the radio communication system 100 includes vehicles 101, 102, and 103. A radio terminal device 111 is mounted on the vehicle 101. A radio terminal device 112 is mounted on the vehicle 102. A radio terminal device 113 is mounted on the vehicle 103.

In addition, FIG. 1 shows a T-junction (intersection) where a road heading in the upper and lower direction of the drawing and a road heading in the left and right direction of the drawing intersect. A radio control device is not installed at the intersection in FIG. 1. In FIG. 1, the T-junction is shown as an intersection where the radio control device is not installed, but it may be, for example, a crossroads. Further, a location where the radio control device is not installed is not limited to an intersection, and may be, for example, a corner of a road with poor visibility. Hereinafter, a T-junction, a crossroads or a corner of a road with poor visibility will be collectively referred to as an intersection.

In FIG. 1, the vehicles 101 and 102 are traveling straight along the road heading in the upper and lower direction of the drawing. The vehicle 103 is traveling straight along the road heading in the left and right direction of the drawing. The vehicle 101 is traveling in an intersection area 121. Note that an intersection area is an area included in an intersection and includes a portion where roads intersects and a portion where a road with poor visibility bends. Hereinafter, these areas will be collectively referred to as an intersection area.

The radio terminal devices 111, 112 and 113 can operate while switching between a control mode and a terminal mode. A radio terminal device operating in the control mode acts as part of a function of a radio control device. That is, the radio terminal device operating in the control mode generates control information by itself, and transmits a communication frame including the generated control information. One communication frame includes one piece of control information. In other words, the communication frame is defined by the transmission interval of the control information. In the following explanation, the radio terminal device operating in the control mode is also referred to as a control mode device.

On the other hand, a radio terminal device operating in the terminal mode operates as an original radio terminal device. That is, the radio terminal device operating in the terminal mode transmits and receives data in synchronization with a received communication frame, in other words, received control information. In the following explanation, the radio terminal device operating in the terminal mode is also referred to as a terminal mode device.

A radio terminal device initially operates in the terminal mode. Thereafter, when a vehicle enters an intersection area, and the radio terminal device mounted on the vehicle cannot receive data from a radio control device, the radio terminal device switches an operation mode from the terminal mode to the control mode.

In FIG. 1, the vehicle 101 is traveling in the intersection area 121. Since the radio control device is not installed at the intersection in FIG. 1, the radio terminal device 111 mounted on the vehicle 101 cannot receive data from the radio control device. In this instance, the radio terminal device 111 switches the operation mode from the terminal mode to the control mode, and becomes the control mode device. The radio terminal device 111 which has become the control mode device transmits a communication frame including control information. A circular segment 131 indicates the coverage of a communication frame transmitted from the radio terminal device 111 operating in the control mode.

In FIG. 1, since the vehicles 102 and 103 are traveling outside the intersection area 121, the radio terminal devices 112 and 113 mounted on the vehicles 102 and 103 become in the terminal mode devices. Since the radio terminal devices 112 and 113 which operate in the terminal mode devices are located inside the circular segment 131, they receive the communication frame including the control information transmitted from the radio terminal device 111. The radio terminal devices 112 and 113 transmit and receive data in synchronization with the received communication frame. As a result, the vehicles 101, 102, and 103 can perform time-aligned radio communication even at the intersection where the radio control device is not installed.

Next, a configuration of the radio terminal devices 111, 112 and 113 according to the first embodiment will be described. Since the radio terminal devices 111, 112 and 113 have the same configuration, only the configuration of the radio terminal device 111 will be described here.

Figure 2:
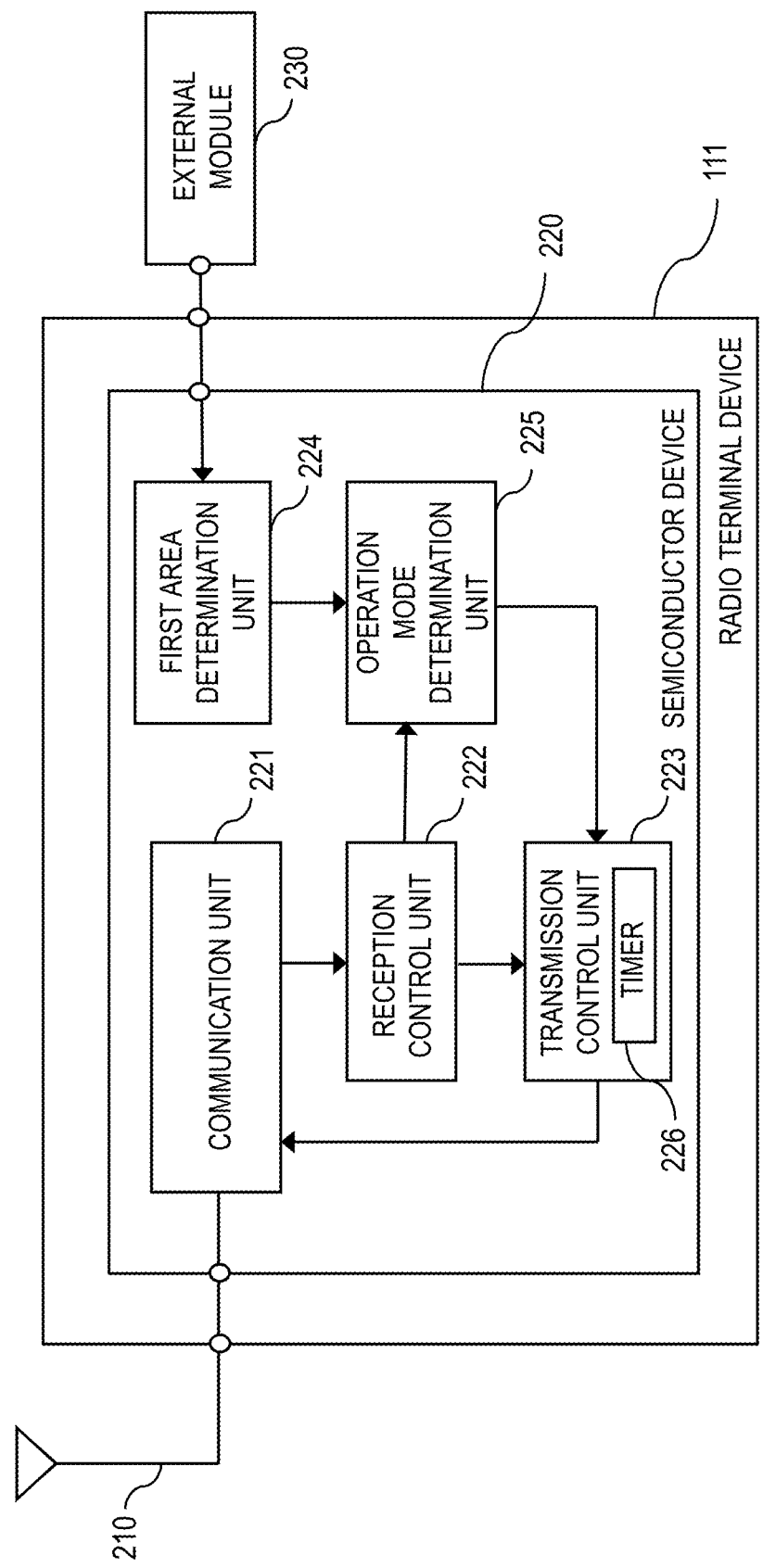
FIG. 2 is a block diagram showing an example of a configuration of a radio terminal device according to one embodiment.

FIG. 2 is a block diagram showing an example of the configuration of the radio terminal device 111 according to the first embodiment. As shown in FIG. 2, the radio terminal device 111 is connected to an antenna 210, and an external module 230. The antenna 210 is used to radiate or receive radio waves. The radio terminal device 111 performs radio communication with a radio control device and other radio terminal device via the antenna 210. As a modulation method of radio communication, for example, an Orthogonal Frequency Division Multiplexing (OFDM) method, a Time Division Multiple Access (TDMA) method, a Frequency Division Multiple Access (FDMA) method, or the like may be adopted.

The external module 230 includes a Global Positioning System (GPS) module and a communication module. The GPS module receives a GPS signal including position information from a GPS satellite. The communication module is connected to an Internet line, and acquires map information. The external module 230 may include a camera module or other sensor module. The external module 230 outputs the received GPS signal and the like to the radio terminal device 111.

The radio terminal device 111 includes a semiconductor device 220. The semiconductor device 220 includes a communication unit 221, a reception control unit 222, a transmission control unit 223, a first area determination unit 224 and an operation mode determination unit 225. The communication unit 221 is connected to the antenna 210, the reception control unit 222, and the transmission control unit 223.

The communication unit 221 receives a radio signal via the antenna 210. The communication unit 221 generates reception data from the received radio signal and outputs the generated reception data to the reception control unit 222. In addition, the communication unit 221 receives transmission data from the transmission control unit 223. The communication unit 221 transmits, as a radio signal, the received transmission data via the antenna 210.

The reception control unit 222 is connected to the communication unit 221, the transmission control unit 223, and the operation mode determination unit 225. The reception control unit 222 receives reception data from the communication unit 221, and extracts control information from the received reception data. The reception control unit 222 outputs the extracted control information to the transmission control unit 223 and the operation mode determination unit 225.

The first area determination unit 224 is connected to the external module 230, and the operation mode determination unit 225. The first area determination unit 224 receives a GPS signal including position information and map information from the GPS module and the communication module included in the external module 230. The first area determination unit 224 determines whether an own vehicle is located in an intersection area, based on the received position information and the map information. The first area determination unit 224 outputs the determination result to the operation mode determination unit 225 as a first area determination result.

The first area determination unit 224 may determine whether the own vehicle is located in the intersection area based on information from the camera module or other sensor module included in the external module 230.

In addition, the first area determination unit 224 outputs a position information acquisition signal to the operation mode determination unit 225. The position information acquisition signal is preferably output in synchronization with a timing at which the first area determination unit 224 acquires position information or the like from the external module 230 or a timing at which the first area determination unit 224 performs determination processing.

The operation mode determination unit 225 is connected to the reception control unit 222, the first area determination unit 224, and the transmission control unit 223. The operation mode determination unit 225 receives control information from the reception control unit 222. The operation mode determination unit 225 receives a first area determination result and a position information acquisition signal from the first area determination unit 224. The operation mode determination unit 225 determines either the control mode or the terminal mode as the operation mode of the radio terminal device 111 based on the received control information and the first area determination result at the time of receiving the position information acquisition signal. The operation mode determination unit 225 outputs information on the determined operation mode to the transmission control unit 223.

The transmission control unit 223 is connected to the communication unit 221, the reception control unit 222, and the operation mode determination unit 225. The transmission control unit 223 includes a timer 226. The timer 226 operates as a free-run counter after starting the radio terminal device 111.

The transmission control unit 223 receives information on the operation mode from the operation mode determination unit 225. If the transmission control unit 223 receives the information on the operation mode indicating the control mode, the transmission control unit 223 performs a transmission operation as the control mode device. Specifically, the transmission control unit 223 generates a communication frame including control information, and outputs, as transmission data, the generated communication frame including the control information to the communication unit 221. At this time, the transmission control unit 223 adds a count value of the timer 226 and identification information for identifying the radio terminal device into the control information. The count value of the timer 226 is a count value of the timer 226 when transmission processing for transmitting the transmission data is performed, more specifically, a count value of the timer 226 when the transmission data is output to the communication unit 221. In addition, the transmission control unit 223 may add vehicle information on the own vehicle, for example, position information or speed information, into the control information.

On the other hand, if the transmission control unit 223 receives the information on the operation mode indicating the terminal mode from the operation mode determination unit 225, the transmission control unit 223 performs a transmission operation as the terminal mode device. Specifically, the transmission control unit 223 generates transmission data including a count value of the timer 226 and identification information for identifying the radio terminal device. The count value of the timer 226 is a count value of the timer 226 when transmission processing for transmitting the transmission data is performed, more specifically, a count value of the timer 226 when the transmission data is output to the communication unit 221. The transmission control unit 223 receives control information from the reception control unit 222, and outputs the generated transmission data to the communication unit 221 in synchronization with a communication frame including the received control information. The transmission data may include vehicle information of the own vehicle.

As described above, the transmission control unit 223 performs two types of transmission processing, i.e., first transmission processing or second transmission processing, according to the operation mode of the radio terminal device 111. When the control mode is determined as the operation mode of the radio terminal device 111, the transmission control unit 223 performs the first transmission processing of outputting, as transmission data, a generated communication frame including control information to the communication unit 221. On the other hand, when the terminal mode is determined as the operation mode of the radio terminal device 111, the transmission control unit 223 performs the second transmission processing of outputting transmission data to the communication unit 221 in synchronization with a received communication frame including control information.

Figure 3:
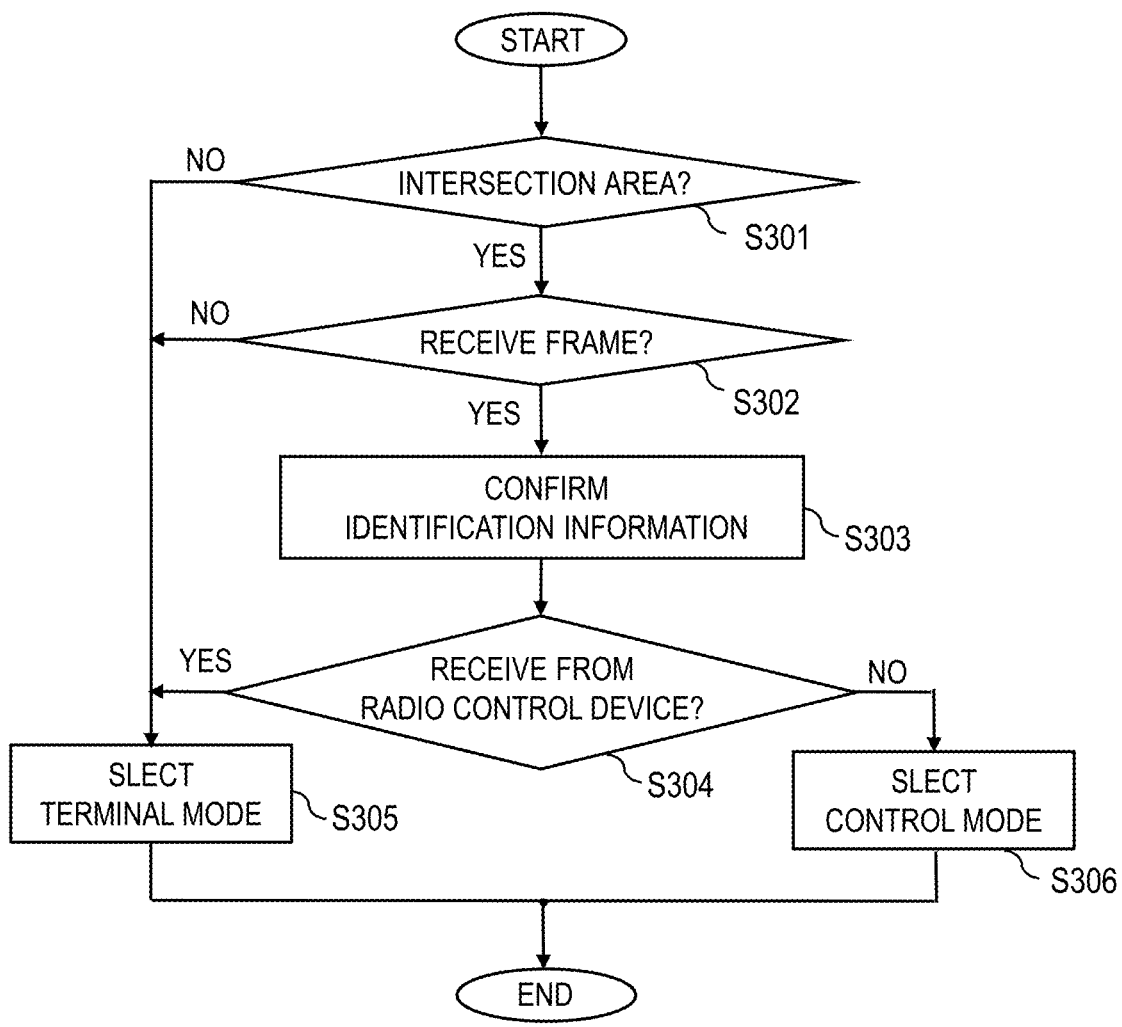
FIG. 3 is a flowchart showing an example of a flow for determining an operation mode of the radio terminal device according to one embodiment.

FIG. 3 is a flowchart showing an example of the flow for determining the operation mode of the radio terminal device 111 according to the first embodiment. As shown in FIG. 3, in a step S301, the first area determination unit 224 determines whether the own vehicle is located in an intersection area based on position information on the own vehicle and map information received from the external module 230. When it is determined that the own vehicle is located in the intersection area (YES in step S301), the processing proceeds to a step S302. On the other hand, when it is determined that the own vehicle is not located in the intersection area (NO in step S301), the processing proceeds to a step S305.

In a step S302, the radio terminal device 111 determines whether a communication frame has been received. If it is determined that the communication frame has been received (YES in step S302), the processing proceeds to a step S303. On the other hand, when it is determined that the communication frame has not been received (NO in step S302), the processing proceeds to the step S305.

In a step S303, the operation mode determination unit 225 receives control information included in the communication frame from the reception control unit 222, and confirms identification information included in the received control information. The identification information is information indicating a radio communication device transmitting a communication frame, in other words, information indicating a transmission source of a communication frame.

In a step S304, the operation mode determination unit 225 determines whether the received communication frame is transmitted from a radio control device based on the confirmed identification information. This determination processing may be performed, for example, by determining whether an identification ID included in the identification information of the received communication frame matches an identification ID of a radio control device stored in a storage unit, which is not shown.

If it is determined that the received communication frame is transmitted from the radio control device (YES in step S304), the processing proceeds to the step S305. On the other hand, when it is determined that the received communication frame is not transmitted from the radio control device (NO in step S304), the processing proceeds to step S306.

In the step S305, the operation mode determination unit 225 determines the operation mode to be the terminal mode. That is, when the own vehicle is not located in the intersection area, when the radio terminal device 111 does not receive a communication frame, or when the radio terminal device 111 receives a communication frame transmitted from a radio control device, the operation mode of the radio terminal device 111 is determined to be the terminal mode. On the other hand, in the step S306, the operation mode determination unit 225 determines the operation mode as the control mode. That is, when the own vehicle is located in an intersection area and a frame received by the radio terminal device 111 is not transmitted from a radio control device, the operation mode of the radio terminal device 111 is determined to be the control mode.

Figure 4:
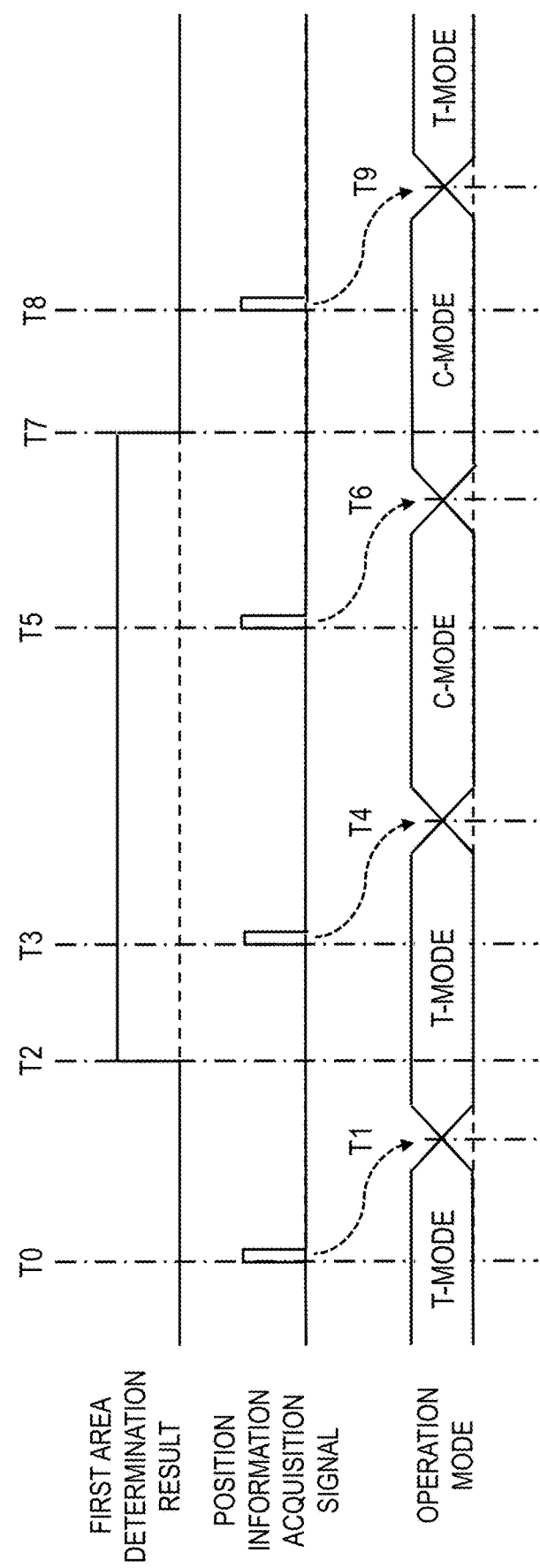
FIG. 4 is a timing chart showing an example of transitions of the operation modes of the radio terminal device according to one embodiment.

FIG. 4 is a timing chart showing an example of transitions of the operation mode of the radio terminal device 111 according to the first embodiment. The lateral direction of FIG. 4 corresponds to time. In the vertical direction of FIG. 4, a first area determination result, a position information acquisition signal, and an operation mode are shown. The first area determination result is indicated by a signal of high level or a signal of low level. The signal of high level indicates that the own vehicle is determined to be located in an intersection area, and the signal of low level indicates that the own vehicle is determined not to be located in an intersection area.

In FIG. 4, it is assumed that the vehicle 101 travels straight along the road heading in the upper and lower direction of FIG. 1, enters the intersection area 121 at a timing t2, and passes through the intersection area 121 at a timing t7. Further, in FIG. 4, since it is assumed a radio control device is not installed at an intersection, it is assumed that the radio terminal device 111 mounted on the vehicle 101 does not receive a communication frame from the radio control device during the entire duration shown in FIG. 4.

As shown in FIG. 4, at a timing t0, the operation mode determination unit 225 receives a position information acquisition signal from the first area determination unit 224. The operation mode determination unit 225 confirms a first area determination result received from the first area determination unit 224 in response to the position information acquisition signal. Since the first area determination result indicates that the own vehicle is not located in an intersection area, the operation mode determination unit 225 continues the operation in the terminal mode (T-MODE) at a timing t1.

At a timing t3, the operation mode determination unit 225 receives a position information acquisition signal from the first area determination unit 224. At this time, since a first area determination result transitioned from the signal of low level to the signal of high level at the timing t2, the operation mode determination unit 225 recognizes that the own vehicle is located in an intersection area. As a result, at a timing t4, the operation mode determination unit 225 switches the operation mode from the terminal mode to the control mode (C-MODE).

At a timing t5, the operation mode determination unit 225 confirms a first area determination result in response to a position information acquisition signal. Since the first area determination result indicates that the own vehicle is located in the intersection area, the operation mode determination unit 225 continues the operation in the control mode at a timing t6.

At a timing t8, the operation mode determination unit 225 receives a position information acquisition signal from the first area determination unit 224. At this time, since a first area determination result transitioned from the signal of high level to the signal of low level at the timing t7, the operation mode determination unit 225 recognizes that the own vehicle is not located in the intersection area. As a result, the operation mode determination unit 225 switches the operation mode from the control mode to the terminal mode at a timing t9.

Figure 5:
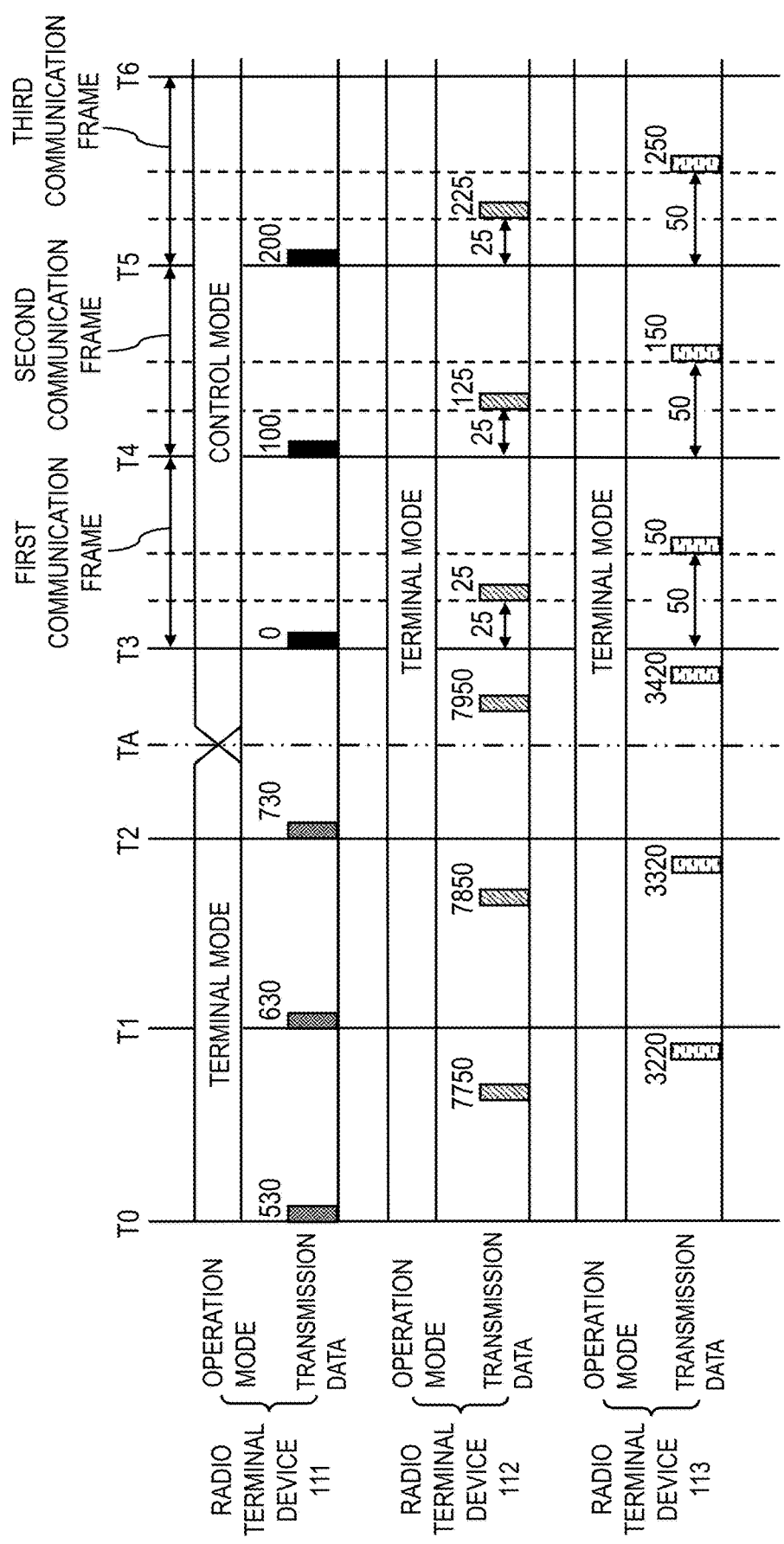
FIG. 5 is a timing chart showing an example of an operation of the radio communication system according to one embodiment.

Next, an example of an operation of the radio communication system 100 according to the first embodiment will be described. FIG. 5 is a timing chart showing an example of the operation of the radio communication system 100 in FIG. 1. The lateral direction of FIG. 5 corresponds to time. In the vertical direction of FIG. 5, an operation mode and transmission data of the radio terminal device 111 mounted on the vehicle 101, an operation mode and transmission data of the radio terminal device 112 mounted on the vehicle 102, and an operation mode and transmission data of the radio terminal device 113 mounted on the vehicle 103 are shown.

Each of the radio terminal devices 111, 112, and 113 determines a transmission timing of transmission data based on a count value of the timer 226. In FIG. 5, the radio terminal devices 111, 112, and 113 perform data transmission each time each timer 226 counts "100". Further, in FIG. 5, numerals described above transmission data indicate the count value of the timer 226 when the transmission processing of transmission data is performed.

In addition, as shown in FIG. 5, in a duration from a timing t3 to a timing t6, a first communication frame, a second communication frame, and a third communication frame are shown. Each communication frame includes one piece of control information transmitted from the radio terminal device 111 operating in the control mode, and a period of each communication frame is defined by a transmission interval of control information. In FIG. 5, the period of each communication frame is set to a duration during which the timer 226 of the radio terminal device 111 counts "100".

It is assumed that the vehicle 101 is located outside the intersection area 121 in a duration from a timing t0 to a timing ta and located inside the intersection area 121 in a duration from the timing ta to the timing t6. Therefore, as shown in FIG. 5, at the timing ta, the operation mode of the radio terminal device 111 mounted on the vehicle 101 is switched from the terminal mode to the control mode. It is also assumed that the vehicles 102 and 103 are located outside the intersection area 121 during the entire duration (from the timing t0 to the timing t6). Therefore, the operation mode of the vehicle 102 and the operation mode of the vehicle 103 remains in the terminal mode for the entire duration (from the timing t0 to the timing t6).

As shown in FIG. 5, since there is no radio terminal device operating in the control mode in the duration from the timing t0 to the timing ta, each of the radio terminal devices 111, 112, and 113 performs transmission processing for transmitting transmission data on the basis of the count value of each timer 226. Since the timers 226 of the radio terminal devices 111, 112 and 113 operate as free-run counters after starting of the radio terminal devices 111, 112 and 113, the numerals described above the transmission data of FIG. 5 are not aligned among the radio terminal devices 111, 112 and 113. These count values are included in the transmission data and transmitted to other vehicles.

On the other hand, in the duration from the timing ta to the timing t6, the radio terminal device 111 operates in the control mode. At the timing t3, the radio terminal device 111 resets the count value of the timer 226 of the radio terminal device 111 to "0", and adds the count value "0" of the timer 226 into control information. Then, the radio terminal device 111 performs transmission processing for transmitting the first communication frame including the control information. Thereafter, the radio terminal device 111 resumes a counting operation of the timer 226.

The radio terminal device 112 and 113 receive, from the radio terminal device 111, the control information included in the first communication frame for which the transmission processing has been performed at the timing t3. The radio terminal devices 112 and 113 set the count value "0" of the timer 226 of the radio terminal device 111 included in the control information to their respective timers 226. Thereafter, the radio terminal devices 112 and 113 resume the counting operation of their respective timers 226. When the count values of their respective timers 226 reach predetermined count values, the radio terminal devices 112 and 113 respectively perform transmission processing for transmitting transmission data in the first communication frame. In the example shown in FIG. 5, the radio terminal device 112 performs the transmission processing for transmitting the transmission data when the count value of the timer 226 of the radio terminal device 112 reaches "25". When the count value of the timer 226 of the radio terminal device 113 reaches "50", the radio terminal device 113 performs the transmission processing for transmitting the transmission data.

Thereafter, the radio terminal device 111 performs transmission processing for transmitting transmission data at a timing t4 when the count value of the timer 226 of the radio terminal device 111 becomes "100". Specifically, the radio terminal device 111 adds the count value "100" of the timer 226 into control information, and performs transmission processing for transmitting the second communication frame including the control information.

The radio terminal devices 112 and 113 receive, from the radio terminal device 111, the control information included in the second communication frame for which the transmission processing has been performed at the timing t4. The radio terminal devices 112 and 113 set the count value "100" of the timer 226 of the radio terminal device 111 included in the control information in their respective timers 226. Thereafter, the radio terminal devices 112 and 113 resume the counting operation of their respective timers 226. When the count values of their respective timers 226 reach predetermined count values, the radio terminal devices 112 and 113 respectively perform transmission processing for transmitting transmission data in the second communication frame. In the example shown in FIG. 5, the radio terminal device 112 performs the transmission processing for transmitting the transmission data when the count value of the timer 226 of the radio terminal device 112 reaches "125". When the count value of the timer 226 of the radio terminal device 113 reaches "150", the radio terminal device 113 performs the transmission processing for transmitting the transmission data.

In a duration from a timing t5 to the timing t6, the radio terminal devices 111, 112, and 113 perform the same processing as the transmission processing performed in a duration from the timing t4 to the timing t5. That is, the radio terminal devices 111, 112, and 113 perform radio communication synchronized with the third communication frame.

As described above, according to the first embodiment, the radio terminal devices 112 and 113 perform transmission processing for transmitting transmission data in synchronization with transmission data transmitted from the radio terminal device 111 operating in the control mode, in other words, a communication frame including control information. That is, even at an intersection where a radio control device is not installed, a radio terminal device operating in the control mode serves as a reference, and a radio terminal device operating in the terminal mode performs transmission control on a shared time axis synchronized with the radio terminal device operating in the control mode, thereby enabling a transmission timing of data received from the radio terminal device mounted on other vehicle to be grasped. Further, the radio terminal devices can share a relative time of received transmission data by referring to a count value of a timer at the time of transmission processing included in transmission data transmitted from other vehicle, and the radio terminal device of the own vehicle can more accurately grasp the transmission timing of the data received from the radio terminal device of the other vehicle.

Second Embodiment

Next, a second embodiment will be described. Components of the second embodiment having the same functions as those of the first embodiment are denoted by the same reference numerals, and descriptions thereof are omitted.

Figure 6:
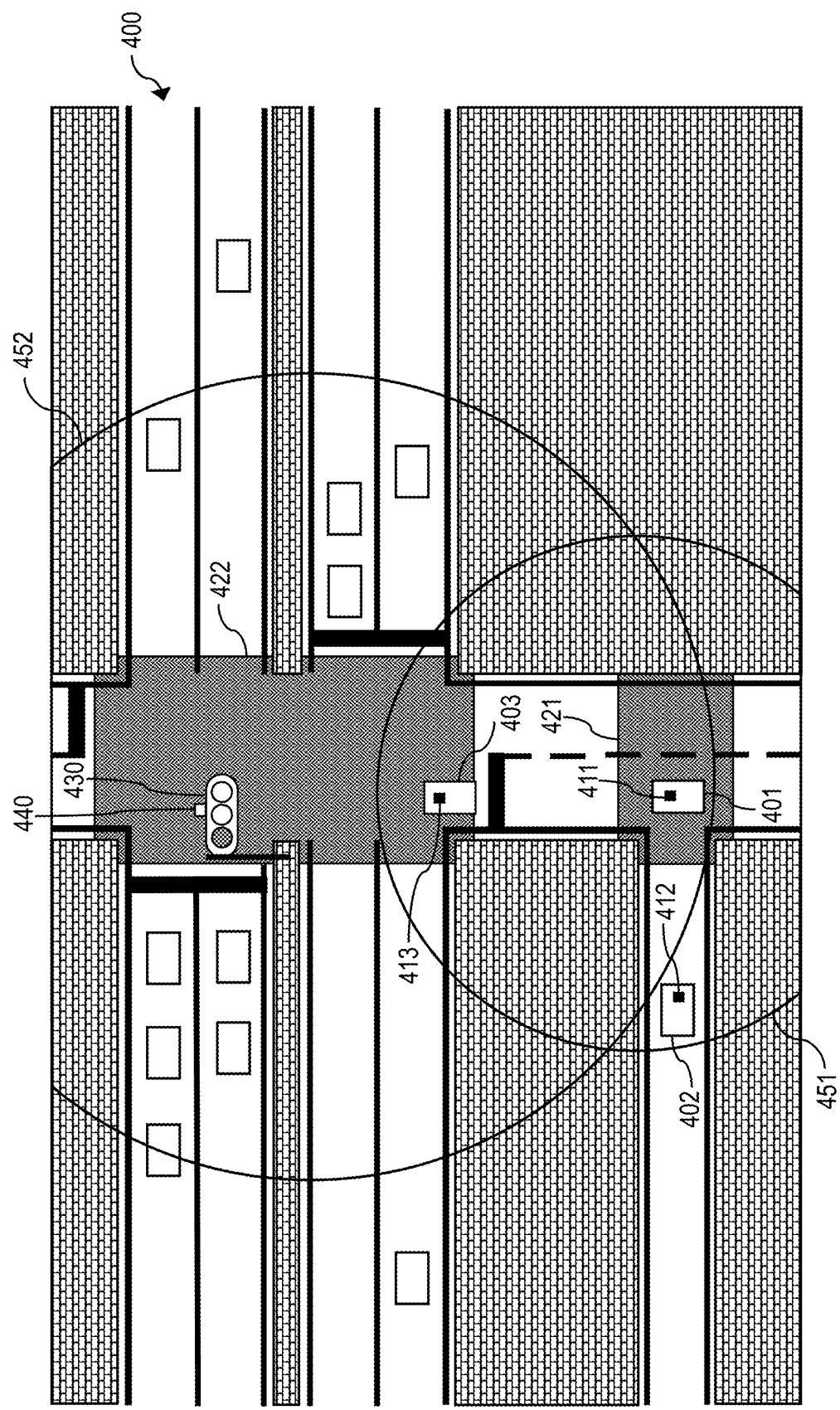
FIG. 6 is a diagram showing an example of a configuration of a radio communication system according to one embodiment.

FIG. 6 is a diagram showing an example of a configuration of a radio communication system 400 according to the second embodiment. FIG. 6 shows an intersection where a radio control device is not installed and an intersection where a radio control device is installed. These intersections are adjacent to each other.

The intersection where the radio control device is not installed shown in the lower part of FIG. 6 includes an intersection area 421. The intersection where the radio control device is not installed corresponds to, for example, the intersection shown in FIG. 1 of first embodiment. Hereinafter, the intersection including the intersection area 421 shown in FIG. 6 is also referred to as a first intersection.

The intersection where the radio control device is installed, shown on the upper side of FIG. 6, includes an intersection area 422. The intersection where the radio control device is installed corresponds to, for example, a large intersection where a traffic signal is installed. In FIG. 6, a traffic signal 430 is installed. A radio control device 440 is also installed in the traffic signal 430. Hereinafter, the intersection including the intersection area 422 shown in FIG. 6 is also referred to as a second intersection.

As shown in FIG. 6, the radio communication system 400 includes vehicles 401, 402, and 403. A radio terminal device 411 is mounted on the vehicle 401. A radio terminal device 412 is mounted on the vehicle 402. A radio terminal device 413 is mounted on the vehicle 403. In FIG. 6, a vehicle is also indicated by a white rectangle which is not denoted by a reference numeral.

A circular segment 451 indicates the coverage of a communication frame transmitted from the radio terminal device 411 operating in the control mode. A circular segment 452 indicates the coverage of a communication frame transmitted from the radio control device 440. Since the first intersection and the second intersection are adjacent to each other, the circular segment 451 and the circular segment 452 have overlapping regions.

In FIG. 6, the vehicle 401 is traveling in the intersection area 421 of the first intersection. Since the intersection area 421 is located at the intersection where the radio control device is not installed, the radio terminal device 411 mounted on the vehicle 401 should originally operate as the control mode device.

However, the radio terminal device 411 is located inside the circular segment 452 and is capable of receiving a communication frame transmitted from the radio control device 440. Therefore, when the flow for determining the operation mode according to the first embodiment is applied, the radio terminal device 411 operates as the terminal mode device. That is, the wireless terminal device 411 cannot fulfill the role of communication control performed as a control mode device at the first intersection. In the second embodiment, a configuration and an operation of a radio terminal device for solving this problem will be described.

Next, configurations of the radio terminal devices 411, 412 and 413 according to the second embodiment will be described. Since the radio terminal devices 411, 412, and 413 have the same configuration, only the configuration of the radio terminal device 411 will be described here.

Figure 7:
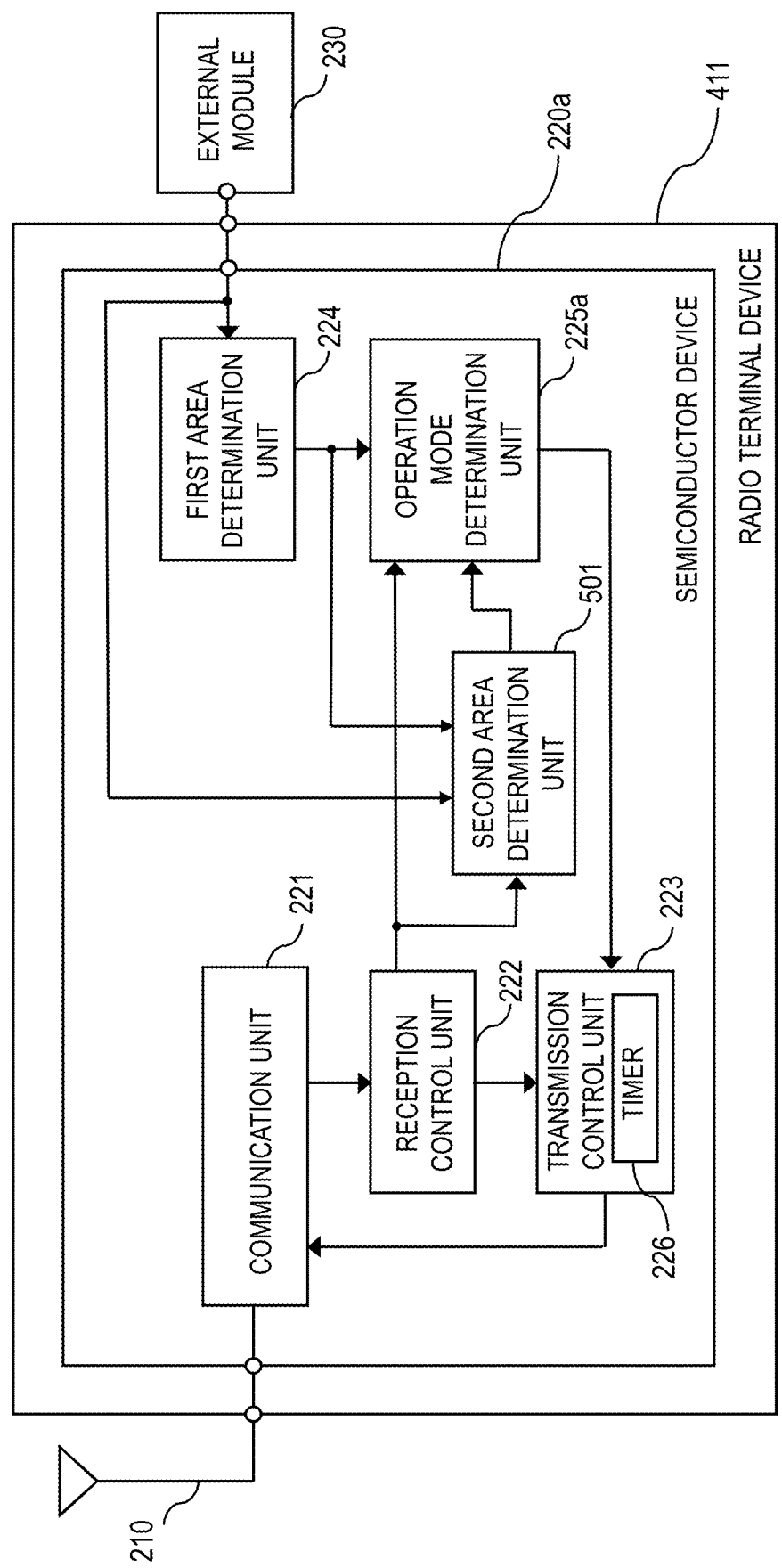
FIG. 7 is a block diagram showing an example of a configuration of a radio terminal device according to one embodiment.

FIG. 7 is a block diagram showing an example of the configuration of the radio terminal device 411 according to the second embodiment. As shown in FIG. 7, the semiconductor device 220 and the operation mode determination unit 225 of FIG. 2 are changed to a semiconductor device 220a and an operation mode determination unit 225a, respectively. The semiconductor device 220a includes a second area determination unit 501 in addition to the configuration of the semiconductor device 220 shown in FIG. 2.

The second area determination unit 501 is connected to the reception control unit 222, the first area determination unit 224, the external module 230, and the operation mode determination unit 225a. The second area determination unit 501 receives control information from the reception control unit 222. Control information includes information on the location where the radio control device that transmitted the communication frame including the control information is installed. That is, the information is position information on the radio control device. The second area determination unit 501 receives position information of the own vehicle and map information from the external module 230.

The second area determination unit 501 receives a first area determination result from the first area determination unit 224. When receiving the first area determination result indicating that the own vehicle is located in an intersection area, the second area determination unit 501 confirms the position information of the radio control device included in the control information. The second area determination unit 501 determines whether the radio control device is installed at the same intersection as the intersection including the intersection area where the own vehicle is located based on the confirmed position information of the radio control device, the received position information of the own vehicle, and the map information. The second area determination unit 501 outputs the determination result to the operation mode determination unit 225a as a second area determination result.

The operation mode determination unit 225a is connected to the reception control unit 222, the first area determination unit 224, the second area determination section 501, and the transmission control unit 223. The operation mode determination unit 225a receives control information from the reception control unit 222. The operation mode determination unit 225a receives a first area determination result and a position information acquisition signal from the first area determination unit 224. The operation mode determination unit 225a receives a second area determination result from the second area determination unit 501. The operation mode determination unit 225a determines either the control mode or the terminal mode as the operation mode of the radio terminal device 411 based on the received control information, the first area determination result, and the second area determination result at the time of receiving the position information acquisition signal. The operation mode determination unit 225a outputs the determined operation mode to the transmission control unit 223.

Figure 8:
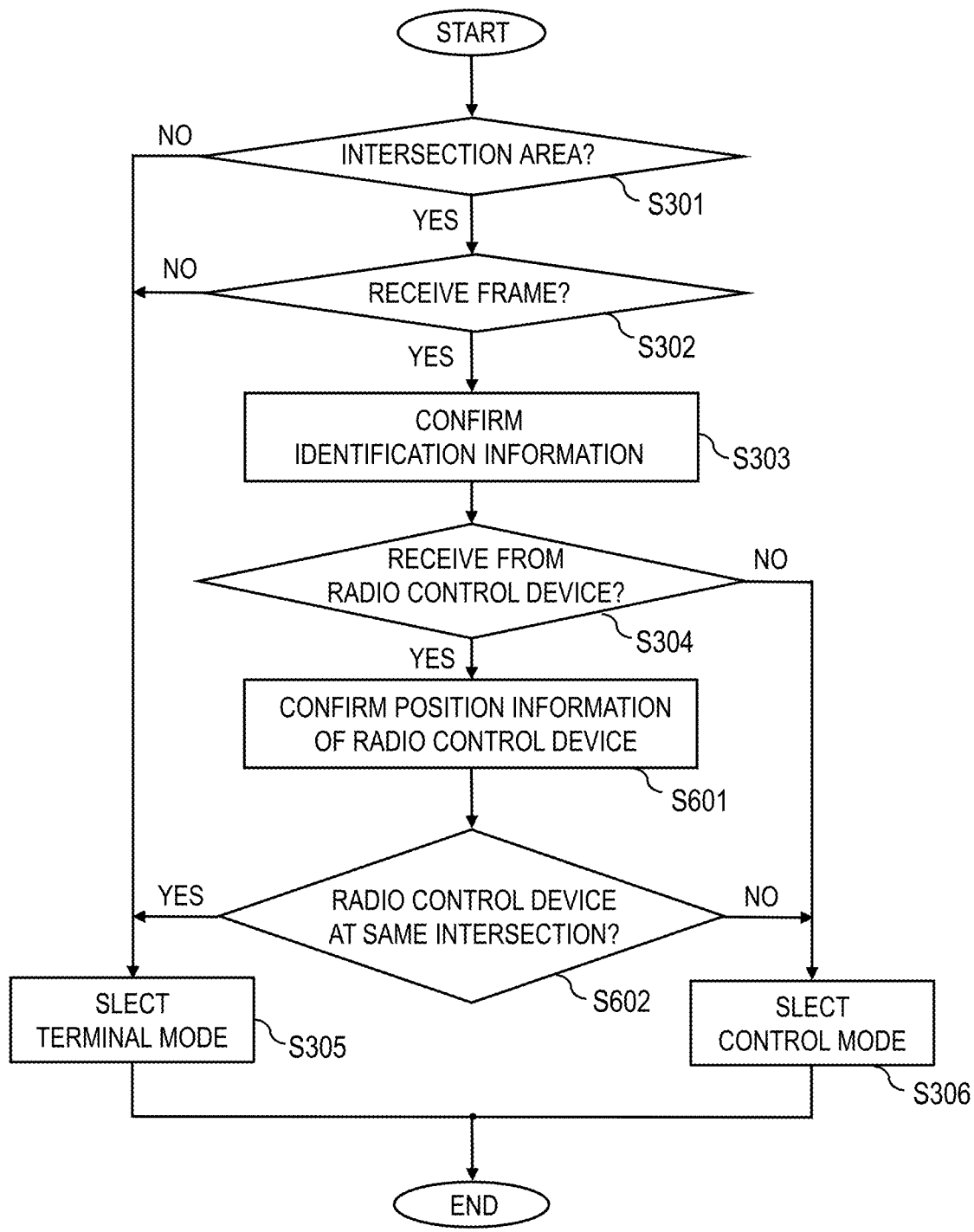
FIG. 8 is a flowchart showing an example flow for determining an operation mode of the radio terminal device according to one embodiment.

FIG. 8 is a flowchart showing an example flow for determining the operation mode of the radio terminal device 411 according to the second embodiment. As shown in FIG. 8, the flowchart of FIG. 8 includes steps S601 and S602 in addition to the steps shown in the flowchart of FIG. 3. If it is determined in the step S304 that the received communication frame is transmitted from a radio control device (YES in step S304), the processing proceeds to the step S601.

In the step S601, the second area determination unit 501 confirms the position information of the radio control device included in the control information received from the reception control unit 222.

In the step S602, the second area determination unit 501 determines whether the radio control device is installed at the same intersection as the intersection including the intersection area where the own vehicle is located, based on the position information of the radio control device, the position information of the own vehicle, and the map information. If it is determined that the radio control device is installed at the same intersection as the intersection including the intersection area where the own vehicle is located (YES in step S602), the processing proceeds to the step S305. On the other hand, when it is determined that the radio control device is not installed at the same intersection as the intersection including the intersection area where the own vehicle is located (NO in step S602), the processing proceeds to the step S306.

For example, in the situation shown in FIG. 6, the radio terminal device 411 mounted on the vehicle 401 is located in the intersection area 421 of the first intersection area (YES in step S301). In addition, the radio terminal device 411 mounted in the vehicle 401 receives a communication frame transmitted from the radio control device 440 installed at the first intersection because the radio terminal device 411 is inside the circular segment 452 (YES in step S302).

The radio terminal device 411 extracts the control information from the received communication frame and confirms the identification information included in the extracted control information (step S303). The radio terminal device 411 determines that the source of the received communication frame is the radio control device 440 on the basis of the confirmed identification information (YES in step S304).

Further, the radio terminal device 411 confirms the position information of the radio control device 440 included in the extracted control information (step S601). Since the vehicle 401 is located at the first intersection, while the radio control device 440 is located at the second intersection, the radio terminal device 411 determines that the radio control device 440 is not installed at the same intersection as the intersection including the intersection area where the own vehicle (vehicle 401) is located (NO in step S602). As a result, the radio terminal device 411 selects the control mode as the operation mode (step S306). Thereby, since the radio terminal device 412 mounted on the vehicle 402 is included in the circular segment 451, the radio terminal device 412 can perform radio communication in synchronization with a communication frame transmitted from the radio terminal device 411 operating in the control mode.

As described above, according to the second embodiment, even if an intersection where a radio control device is installed and an intersection where a radio control device is not installed adjoin, and a radio terminal device located in an intersection area of an intersection where the radio control device is not installed receives a communication frame transmitted from the radio control device, the radio terminal device can select the control mode as the operation mode and operate as a control mode device.

In FIG. 6, the vehicle 403 located at the second intersection is included in both the circular segments 451 and 452. The radio terminal device 413 mounted on the vehicle 403 operates as a terminal mode device, but receives both a communication frame from the radio control device 440 and a communication frame from the radio terminal device 411 operating in the control mode. In this instance, the radio terminal device 413 cannot determine which communication frame the radio communication should be performed in synchronization with.

Therefore, the radio terminal device 413 determines the communication frame to be synchronized based on the position information of the radio control device 440 and the radio terminal device 411 operating in the control mode. Specifically, first, the radio terminal device 413 acquires position information of the own vehicle and map information from the external module 230.

In addition, the radio terminal device 413 acquires the position information of the source of the communication frame from the control information included in the received communication frame. In FIG. 6, the radio terminal device 413 acquires the position information of the radio control device 440 from the control information included in the communication frame transmitted from the radio control device 440, and acquires the position information of the vehicle 401 mounted with the radio terminal device 411 from the control information included in the communication frame transmitted from the radio terminal device 411.

Next, the radio terminal device 413 determines whether to perform radio communication in synchronization with the communication frame transmitted from the radio control device 440 or the communication frame transmitted from the radio terminal device 411, based on the position information of the own vehicle, the position information of the radio control device 440, the position information of the vehicle 401 on which the radio terminal device 411 is mounted, and the map information. In FIG. 6, since the vehicle 403 is located in the intersection area 422 of the intersection where the radio control device 440 is installed, the radio control device 413 determines that the radio communication should be performed in synchronization with the communication frame transmitted from the radio control device 440.

In this manner, even if a plurality of communication frames is received, a radio terminal device operating in the terminal mode according to the second embodiment can determine which communication frame to synchronize with by confirming the position information of the source of the received communication frame.

Third Embodiment

Next, a third embodiment will be described. Components of the third embodiment having the same functions as those of the first and second embodiments are denoted by the same reference numerals, and descriptions thereof are omitted.

Figure 9:
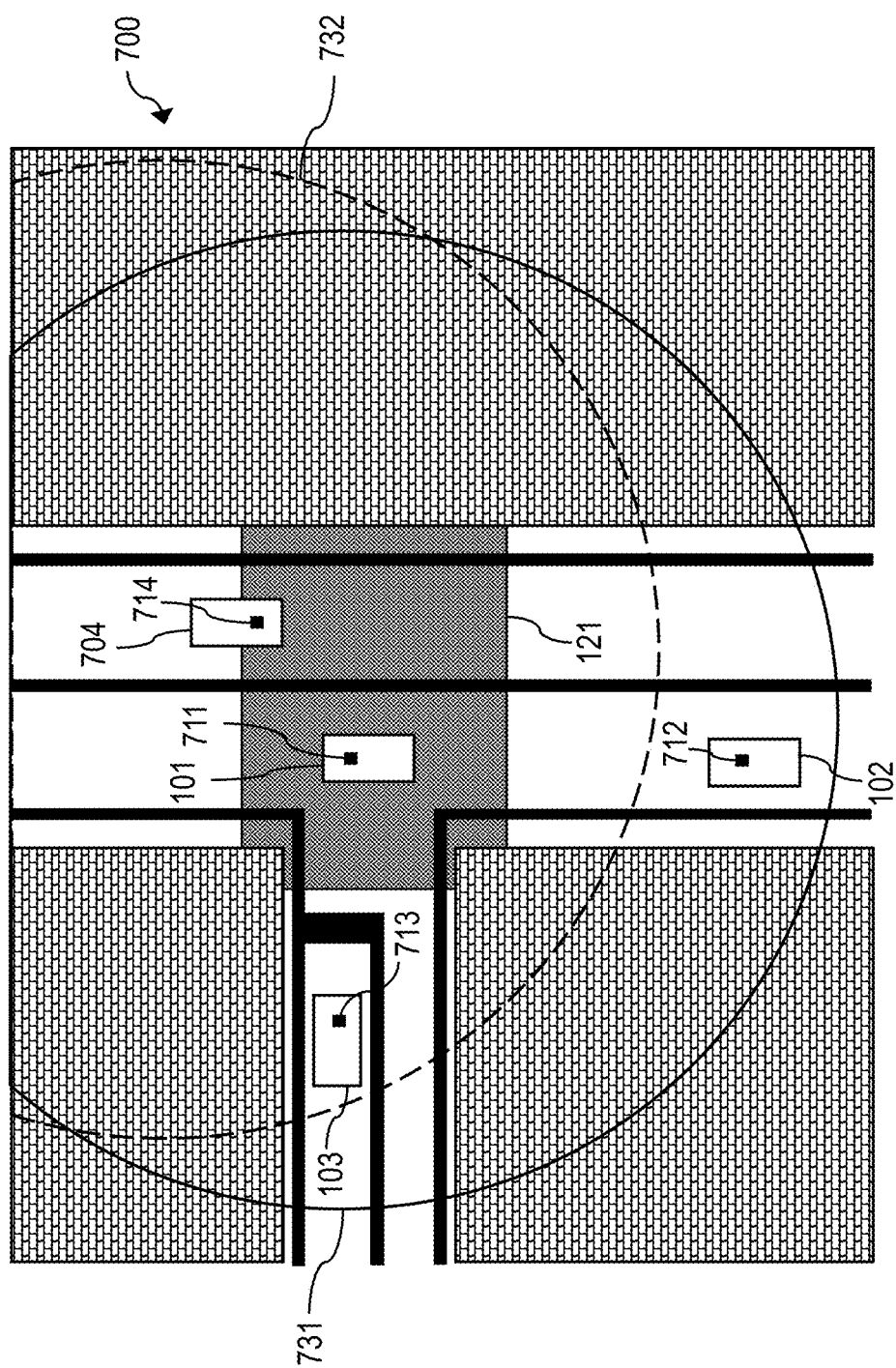
FIG. 9 is a diagram showing an example of a configuration of a radio communication system according to one embodiment.

FIG. 9 is a diagram showing an example of a configuration of a radio communication system 700 according to the third embodiment. FIG. 9 shows, as in FIG. 1, an intersection where a radio control device is not installed. The radio communication system 700 shown in FIG. 9 includes a vehicle 704 in addition to the configuration of the radio communication system 100 shown in FIG. 1. A radio terminal device 714 is mounted on the vehicle 704. The radio terminal devices 111, 112, and 113 of FIG. 1 are changed to the radio terminal devices 711, 712, and 713, respectively. A circular segment 731 indicates the coverage of a communication frame transmitted from the radio terminal device 711 operating in the control mode.

As shown in FIG. 9, since the vehicle 101 is traveling in the intersection area 121, the radio terminal device 711 mounted on the vehicle 101 operates as the control mode device. At this time, it is assumed that the vehicle 704 has entered the intersection area 121. Since the radio terminal device 711 which operates as the control mode device already exists in the intersection area 121, the radio terminal device 714 mounted on the vehicle 704 which has later entered the intersection area 121 should originally operate as the terminal mode device.

However, if the flow for determining the operation mode according to the first embodiment or second embodiment is applied, the radio terminal device 714 operates as the control mode device. Here, a circular segment 732 indicates the coverage of a communication frame transmitted from the radio terminal device 714 when the radio terminal device 714 operates in the control mode. Since the vehicle 102 is included in the circular segment 731 and not included in the circular segment 732, the radio terminal device 712 can perform wireless communication in synchronization with a communication frame transmitted from the radio terminal device 711. On the other hand, since the vehicle 103 is included in both the circular segments 731 and 732, the radio terminal device 713 receives both a communication frame transmitted from the radio terminal device 711 and a communication frame transmitted from the radio terminal device 714. In this instance, the radio terminal device 713 cannot determine which communication frame radio communication should be performed in synchronization with. In the third embodiment, a configuration and an operation of a radio terminal device for solving this problem will be described.

Next, the configuration of the radio terminal devices 711, 712, 713 and 714 according to the third embodiment will be described. Since the radio terminal devices 711, 712, 713 and 714 have the same configuration, only the configuration of the radio terminal device 711 will be described here.

Figure 10:
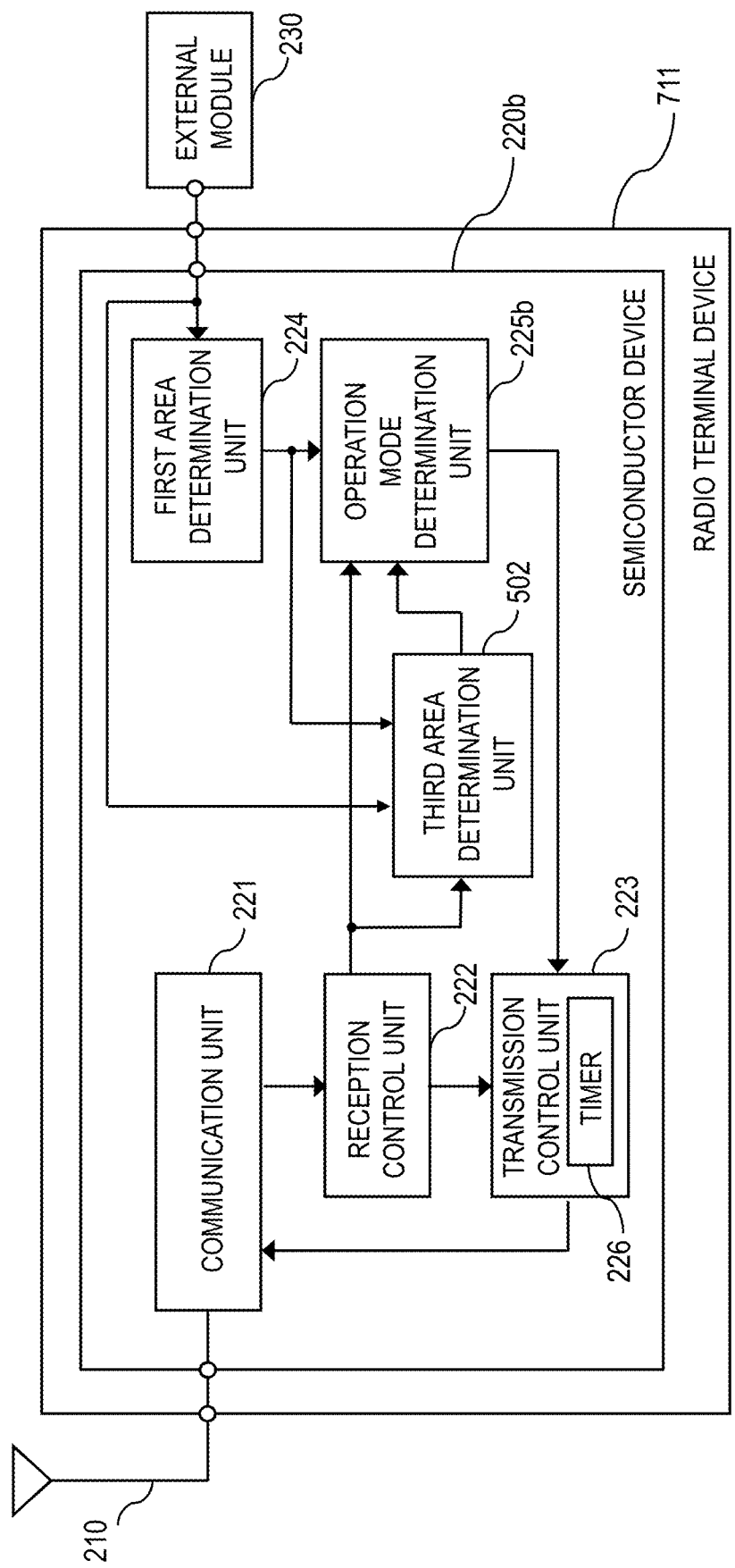
FIG. 10 is a block diagram showing an example of a configuration of a radio terminal device according to one embodiment.

FIG. 10 is a block diagram showing an example of the configuration of the radio terminal device 711 according to the third embodiment. As shown in FIG. 10, the semiconductor device 220 and the operation mode determination unit 225 of FIG. 2 are changed to the semiconductor device 220*b* and the operation mode determination unit 225*b*, respectively. The semiconductor device 220*b* includes a third area determination unit 502 in addition to the configuration of the semiconductor device 220 shown in FIG. 2.

The third area determination unit 502 is connected to the reception control unit 222, the first area determination unit 224, the external module 230, and the operation mode determination unit 225*b*. The third area determination unit 502 receives control information from the reception control unit 222. Control information includes information on the location where the other vehicle on which the control mode device transmitting the communication frame including the control information is mounted is located. That is, the information is position information on the other vehicle mounted with the control mode device. The third area determination unit 502 receives position information of the own vehicle and map information from the external module 230.

The third area determination unit 502 receives a first area determination result from the first area determination unit 224. When receiving the first area determination result indicating that the own vehicle is located in an intersection area, the third area determination unit 502 confirms the position information of the other vehicle on which the control mode device included in the control information is mounted. The third area determination unit 502 determines whether the other vehicle on which the control mode device is mounted is located at the same intersection as the intersection including the intersection area where the own vehicle is located, based on the confirmed position information of the other vehicle on which the control mode device is mounted, the received position information of the own vehicle, and the received map information. The third area determination unit 502 outputs the determination result to the operation mode determination unit 225*b* as a third area determination result.

The operation mode determination unit 225*b* is connected to the reception control unit 222, the first area determination unit 224, the third area determination unit 502, and the transmission control unit 223. The operation mode determination unit 225*b* receives control information from the reception control unit 222. The operation mode determination unit 225*b* receives a first area determination result and a position information acquisition signal from the first area determination unit 224. The operation mode determination unit 225*b* receives a third area determination result from the third area determination unit 502. The operation mode determination unit 225*b* determines either the control mode or the terminal mode as the operation mode of the radio terminal device 711 based on the received control information, the first area determination result, and the third area determination result at the time receiving the position information acquisition signal. The operation mode determination unit 225*b* outputs the determined operation mode to the transmission control unit 223.

Figure 11:
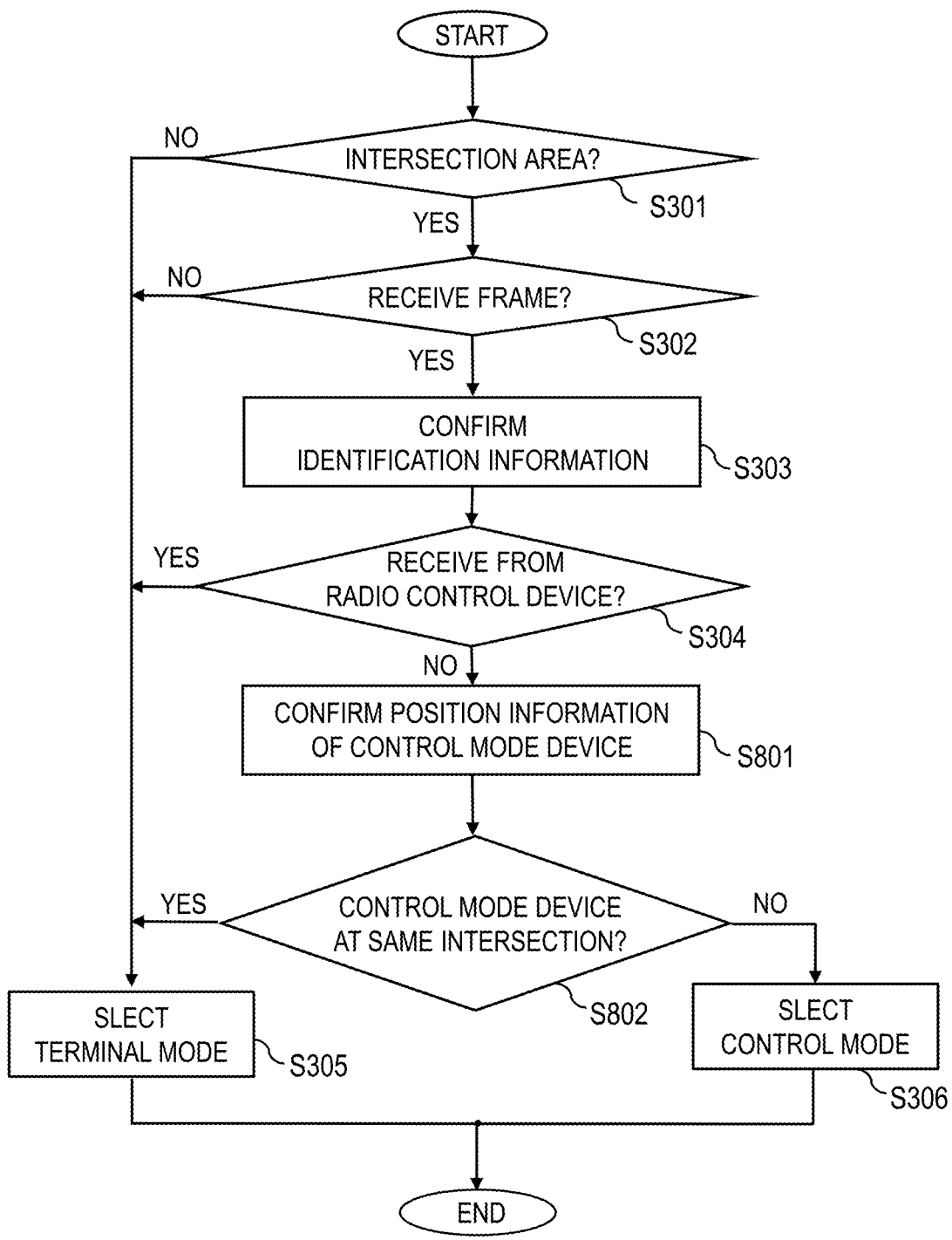
FIG. 11 is a flowchart showing an example of a flow for determining an operation mode of a radio terminal device according to one embodiment.

FIG. 11 is a flowchart showing an example of a flow for determining the operation mode of the radio terminal device 711 according to the third embodiment. As shown in FIG. 11, the flowchart of FIG. 11 includes steps S801 and S802 in addition to the steps shown in the flowchart of FIG. 3. If it is determined in the step S304 that the received communication frame is not transmitted from a radio control device (NO in step S304), the processing proceeds to the step S801.

In the step S801, the third area determination unit 502 confirms the position information of the other vehicle on which the control mode device is mounted included in the control information received from the reception control unit 222.

In the step S802, the third area determination unit 502 determines whether the other vehicle on which the control mode device is mounted is located at the same intersection as the intersection including the intersection area where the own vehicle is located, based on the position information of the other vehicle on which the control mode device is mounted, the position information of the own vehicle, and the map information. When it is determined that other vehicle on which the control mode device is mounted is located at the same intersection as the intersection including the intersection area where the own vehicle is located (YES in step S802), the processing proceeds to the step S305. On the other hand, if it is determined that other vehicle on which the control mode device is mounted is not located at the same intersection as the intersection including the intersection area where the own vehicle is located (NO in step S802), the processing proceeds to the step S306.

For example, in the situation shown in FIG. 9, the radio terminal device 714 mounted on the vehicle 704 is located in the intersection area 121 (YES in step S301). Since the radio terminal device 714 mounted in the vehicle 704 is inside the circular segment 731, the radio terminal device 714 receives a communication frame transmitted from the radio terminal device 711 operating as the control mode device (YES in step S302).

The radio terminal device 714 extracts the control information from the received communication frame, and confirms the identification information included in the extracted control information in the step S303. The radio terminal device 714 determines that the source of the received communication frame is not a radio control device but the control mode device (radio terminal device 711) based on the confirmed identification information (NO in step S304).

In addition, the radio terminal device 714 confirms the position information of the vehicle 101 on which the control mode device (radio terminal device 711) is mounted included in the extracted control information (step S801). Since the vehicle 704 and the vehicle 101 are located at the intersection including the intersection area 121, the radio terminal device 714 determines that the vehicle 101 on which the control mode device (radio terminal device 711) is mounted is located at the same intersection as the intersection where the own vehicle (vehicle 704) is located (YES in step S802). As a result, the radio terminal device 714 selects the terminal mode as the operation mode (step S306). Thereby, the radio control device 713 mounted on the vehicle 103 can perform radio communication by receiving only the communication frame transmitted from the radio terminal device 711 operating in the control mode.

As described above, according to the third embodiment, even if a radio terminal device operating in the control mode exists at an intersection where a radio control device is not installed, the radio terminal device which has entered the intersection area later operates as the terminal mode device, and can perform radio communication in synchronization with a communication frame transmitted from the radio terminal device operating in the control mode.

Fourth Embodiment

Next, a fourth embodiment will be described. In the fourth embodiment, a radio terminal device 111c which is another embodiment of the radio terminal device 111 according to the first embodiment will be described. Components of the fourth embodiment having the same functions as those of the first embodiment are denoted by the same reference numerals, and descriptions thereof are omitted.

Figure 12:
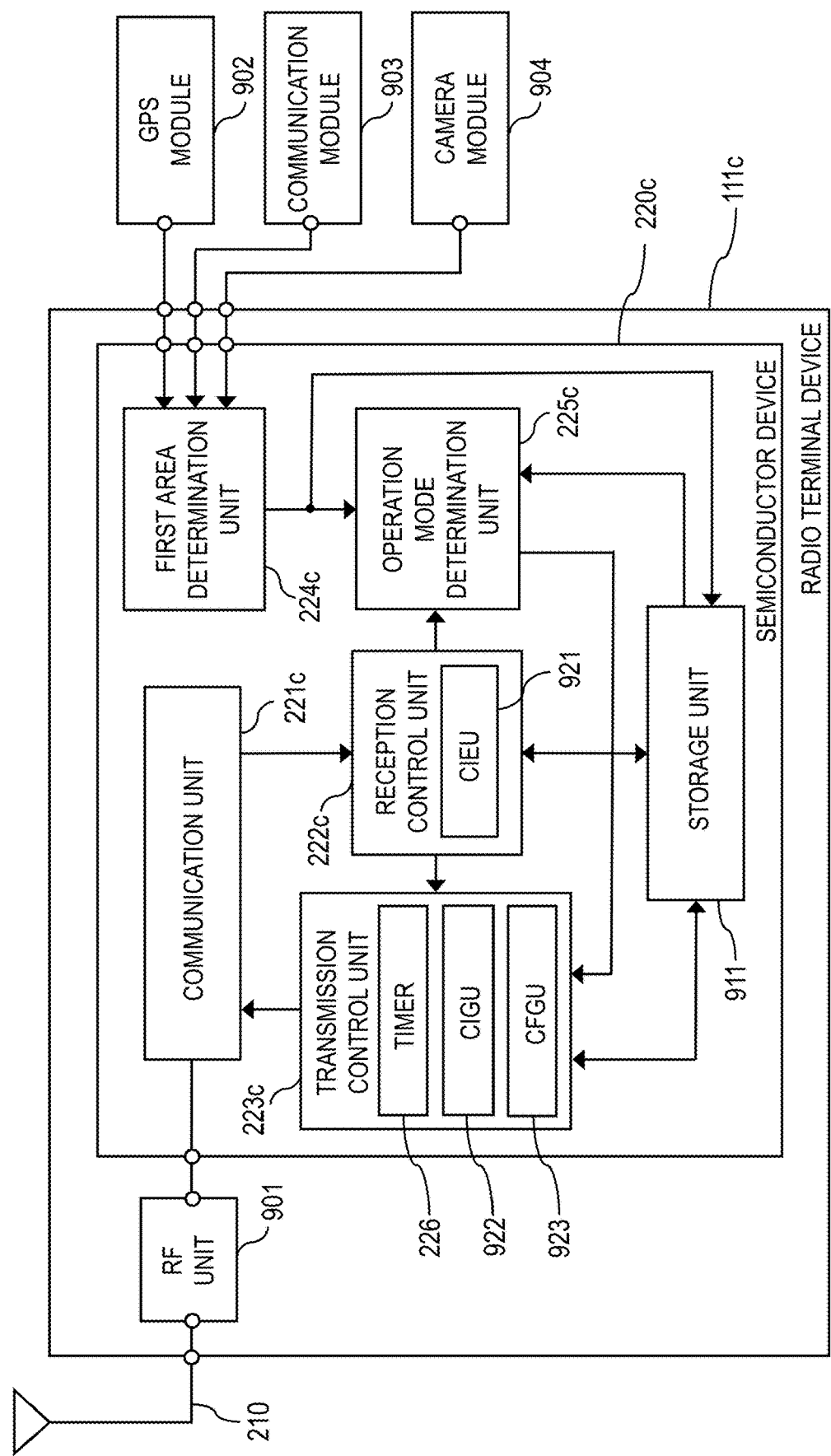
FIG. 12 is a block diagram showing an example of a configuration of a radio terminal device according to one embodiment.

FIG. 12 is a block diagram showing an example of the configuration of the radio terminal device 111c according to the fourth embodiment. As shown in FIG. 12, the semiconductor device 220, the communication unit 221, the reception control unit 222, the transmission control unit 223, the first area determination unit 224, and the operation mode determination unit 225 of FIG. 2 are changed to semiconductor device 220c, the communication unit 221c, the reception control unit 222c, the transmission control unit 223c, the first area determination unit 224c, and the operation mode determination unit 225c, respectively. Also, in FIG. 12, the external module 230 of FIG. 2 is replaced by a GPS module 902, a communication module 903, and a camera module 904. The radio terminal device 111c includes an Radio Frequency (RF) unit 901 in addition to the configuration of the radio terminal device 111 shown in FIG. 2. The semiconductor device 220c includes a storage unit 911 in addition to the configuration of the semiconductor device 220 shown in FIG. 2.

The RF unit 901 is connected between the antenna 210 and the semiconductor device 220c. The RF unit 901 includes an RF switch, a bandpass filter (BPF), a power amplifier (PA), and a low noise amplifier (LNA), which are not shown. The RF switch is a switch for switching between a transmission path and a reception path of a high frequency signal used for radio communication. The BPF is disposed in the transmission path and the reception path, and passes only a signal having a specific frequency. The PA is disposed in the transmission path and amplifies the power of a signal transmitted from the antenna. The LNA is disposed in the reception path and amplifies a signal received via the antenna 210.

When the radio terminal device 111c transmits data, the RF unit 901 transmits, from the antennas 210, a radio frequency packet signal (transmission signal) outputted from the semiconductor device 220c via the PA, BPF, and RF switch. On the other hand, when the radio terminal device 111c receives data, the RF unit 901 outputs a radio frequency packet signal (reception signal) received from the antennas 210 to the semiconductor device 220c via the RF switch, BPF, and LNA.

The communication unit 221c is connected to the RF unit 901, the reception control unit 222c, and the transmission control unit 223c. The communication unit 221c includes a transmission circuit, a reception circuit, a digital-to-analog conversion circuit (D/A), an analog-to-digital conversion circuit (A/D), and a baseband unit, which are not shown.

The transmission circuit, the D/A and the baseband unit are disposed in a transmission path of the communication unit 221c. When the radio terminal device 111c transmits data, the baseband unit performs OFDM modulation processing on transmission data received from the transmission control unit 223c, and generates a packet signal of a baseband OFDM. The generated baseband OFDM signal is converted from digital to analog by D/A, and output to the transmission circuit. The transmission circuit performs frequency conversion processing on the received baseband OFDM signal to generate a radio frequency packet signal. The generated radio frequency packet signal is outputted to the PA.

The reception circuit, the A/D, and the baseband unit are disposed in a reception path of the communication unit 221c. When the radio terminal device 111c receives data, the reception circuit performs frequency conversion processing on the radio frequency packet signal received from the LNA to generate a packet signal of a baseband OFDM. The generated packet signal of the baseband OFDM is converted from analog to digital by the A/D, and output to the baseband unit. The baseband unit performs OFDM demodulation processing on the received packet signal of the baseband OFDM to generate a reception data. The generated reception data is output to the reception control unit 222c.

The reception control unit 222c is connected to the communication unit 221c, the transmission control unit 223c, the operation mode determination unit 225c, and the storage unit 911. The storage unit 911 stores identification information including the identification ID allocated to the radio terminal device 111c. The storage unit 911 stores speed information of the own vehicle acquired by an Electronic Control Unit (ECU) device, which is not shown, and the like. In addition, the storage unit 911 stores reception data, position information of the own vehicle, and the like, as will be described later. The storage unit 911 may be any storage unit capable of storing data, such as a register or a Random Access Memory (RAM), and may be volatile or non-volatile.

The reception control unit 222c receives the reception data output from the baseband unit of the communication unit 221c, and stores it in the storage unit 911. The reception control unit 222c includes a control information extraction unit (CIEU) 921. The control information extraction unit 921 extracts control information from the reception data received from the baseband unit of the communication unit 221. The extracted control information is output to the transmission control unit 223c and the operation mode determination unit 225c. Note that the reception control unit 222c may have a function of deleting the received data of the communication frame whose validity period has expired.

The first area determination unit 224c is connected to the GPS module 902, the communication module 903, the camera module 904, the operation mode determination unit 225c, and the storage unit 911. The first area determination unit 224c receives a GPS signal including position information of the own vehicle from the GPS module 902. The first area determination unit 224c receives map information from the communication module 903. The first area determination unit 224c receives a captured image around the own vehicle from the camera module 904.

The first area determination unit determines whether the own vehicle is located in an intersection area based on the position information of the own vehicle and the map information, or based on the captured image around the own vehicle. The first area determination unit 224c outputs the determination result to the operation mode determination unit 225c as a first area determination result. The first area determination unit 224c does not necessarily have to receive map information from the communication module 903 connected to the Internet line. For example, the storage unit 911 may store map information in advance, and the first area determination unit 224c may read the map information from the storage unit 911.

The first area determination unit 224c outputs a position information acquisition signal to the operation mode determination unit 225c in synchronization with the timing at which the position information, the map information, or the captured image of the own vehicle is received or the timing at which determination processing is performed. The position information acquisition signal may be generated by the first area determination unit 224c. Alternatively, the position information acquisition signal may be a signal output from any one of the GPS module 902, the communication module 903, and the camera module 904, or a signal generated by a combination of these signals.

The first area determination unit 224c stores the position information of the own vehicle received from the GPS module 902, the map information received from the communication module 903, and the captured image around the own vehicle received from the camera module 904 in the storage unit 911.

The operation mode determination unit 225c is connected to the reception control unit 222c, the transmission control unit 223c, the first area determination unit 224c, and the storage unit 911. The operation mode determination unit 225c receives the control information extracted by the control information extraction unit 921 from the reception control unit 222c. The operation mode determination unit 225c receives the first area determination result and the position information acquisition signal from the first area determination unit 224c. The operation mode determination unit 225c determines either the control mode or the terminal mode as the operation mode of the radio terminal device 111c at the time of receiving the position information acquisition signal.

Specifically, when receiving the first area determination result indicating that the own vehicle is located in the intersection area, the operation mode determination unit 225c refers to the received control information, and confirms the identification information indicating the source of the communication frame. At this time, as control information to be referred to, control information included in a communication frame within an expiration date is set as a target.

The identification information includes an identification ID. The identification ID is, for example, information allocated to identify a device that transmitted a communication frame. The storage unit 911 stores an identification ID list including an identification ID allocated to a radio control device. The operation mode determination unit 225c refers to the identification ID list stored in the storage unit 911, and determines whether the confirmed identification ID included in the identification information is an identification ID allocated to a radio control device.

When it is determined that the confirmed identification ID included in the identification information is the identification ID allocated to the radio control device, the operation mode determination unit 225c determines the operation mode as the terminal mode. On the other hand, when it is determined that the confirmed identification ID included in the identification information is not the identification ID allocated to the radio control device, the operation mode determination unit 225c determines the operation mode as the control mode. The operation mode determination unit 225c outputs information on the determined operation mode to the transmission control unit 223c.

The transmission control unit 223c is connected to the communication unit 221c, the reception control unit 222c, the operation mode determination unit 225c, and the storage unit 911. In addition, the transmission control unit 223c includes the timer 226, a control information generation unit (CIGU) 922, and a communication frame generation unit (CFGU) 923.

When receiving information on the operation mode indicating the control mode from the operation mode determination unit 225c, the transmission control unit 223c performs a transmission operation as the control mode device. Specifically, the control information generation unit 922 receives, from the timer 226, a count value when transmission processing of transmission data is performed, more specifically, when the transmission data is output to the baseband unit of the communication unit 221c. The control information generation unit 922 reads the identification information of the radio terminal device 111c from the storage unit 911. The control information generation unit 922 generates control information including the count value of the timer 226 and the identification information of the radio terminal device 111c. Note that the control information generation unit 922 may read vehicle information of the own vehicle, for example, position information or speed information, from the storage unit 911, and may add the read vehicle information of the own vehicle into the control information.

The communication frame generation unit 923 generates a communication frame including the control information generated by the control information generation unit 922 as transmission data. The generated transmission data is output to the baseband unit of the communication unit 221c.

On the other hand, when receiving information on the operation mode indicating the terminal mode from the operation mode determination unit 225c, the transmission control unit 223c performs a transmission operation as the terminal mode device. Specifically, the transmission control unit 223c receives, from the timer 226, a count value when transmission processing of transmission data is performed, more specifically, when the transmission data is output to the baseband unit of the communication unit 221c. The control information generation unit 922 reads the identification information of the radio terminal device 111c from the storage unit 911. The transmission control unit 223c generates transmission data including the identification information for identifying the radio terminal device 111c and the count value of the timer 226. The transmission control unit 223c receives the control information from the reception control unit 222c, and outputs the generated transmission data to the baseband unit of the communication unit 221c in synchronization with the received communication frame including the control information. The transmission data may include vehicle information of the own vehicle.

As described above, the transmission control unit 223c performs two types of transmission processing, i.e., first transmission processing or second transmission processing, according to the operation mode of the radio terminal device 111c. When the control mode is determined as the operation mode of the radio terminal device 111c, the transmission control unit 223c performs the first transmission processing of outputting, as transmission data, a communication frame generated by the communication frame generation unit 923 to the baseband unit of the communication unit 221c. On the other hand, when the terminal mode is determined as the operation mode of the radio terminal device 111c, the transmission control unit 223c performs the second transmission processing of outputting transmission data to the baseband unit of the communication unit 221c in synchronization with a received communication frame including control information.

According to the fourth embodiment, like the first embodiment, the radio terminal device can operate as the control mode device in an intersection area of an intersection where a radio control device is not installed. That is, even at an intersection where a radio control device is not installed, a radio terminal device operating in the control mode serves as a reference, and a radio terminal device operating in the terminal mode can perform transmission control on a shared time axis synchronized with the radio terminal device operating in the control mode.

In the first to fourth embodiments, the semiconductor devices 220, 220a, and 220b are illustrated as including the communication unit 221, and the semiconductor device 220c is illustrated as including the communication unit 221c, and the storage unit 911, respectively, but the configurations of the semiconductor devices 220, 220a, 220b, and 220c are not limited thereto. For example, in the semiconductor 200, the communication unit 221 and the other blocks may be formed as separate semiconductor device. Each of the semiconductor devices 220, 220a, 220b, and 220c may be formed on one semiconductor chip, or may be formed dividing the semiconductor chip into a plurality of semiconductor chips.

The semiconductor devices 220, 220a, 220b, and 220c can be configured only by hardware (H/W) or by cooperation of H/W and software (S/W). That is, FIG. 2, FIG. 7, FIG. 10, and FIG. 12 depict functional blocks realized only by H/W, only by S/W, or by cooperation of H/W and S/W.

When the semiconductor devices 220, 220a, 220b, and 220c are configured only by H/W, the blocks of the semiconductor device 220, 220a, 220b, and 220c (communication units 221 and 221c, reception control units 222 and 222c, transmission control units 223 and 223c, first area determination units 224 and 224c, operation mode determination units 225, 225a, 225b, and 225c, second area determination unit 501, third area determination unit 502, and storage unit 911) are configured by circuits, respectively.

On the other hand, when the semiconductor device 220, 220a, 220b, and 220c is configured by the cooperation of H/W and S/W, for example, the operation mode determination units 225, 225a, 225b, and 225c are configured by a processor, and the function of the operation mode determination units 225, 225a, 225b, and 225c can be realized by the processor reading and executing a predetermined program stored in a storage unit, which is not shown.

Further, in the first to fourth embodiments, although it has been described that a radio terminal device is mounted on a vehicle, the term "mounted on a vehicle" here is not limited to an aspect in which the radio terminal device is incorporated in vehicle body as a part of a component. For example, an aspect in which a mobile terminal such as a smartphone capable of operating application software for realizing the functions of the first to fourth embodiments is brought into a vehicle may also be included.

Although the invention made by the present inventors has been specifically described based on the embodiments, it is needless to say that the present invention is not limited to the above-described embodiments, and various changes may be made without departing from the scope thereof.

What is claimed is:

1. A semiconductor device for controlling a radio terminal device mounted on a first vehicle, the semiconductor device comprising:
    circuitry configured to function as:
        a communication unit configured to receive a first communication frame to generate reception data, and transmit transmission data;

a reception control unit configured to extract first control information from the reception data, the first control information including identification information for identifying a radio communication device transmitting the first communication frame;

a transmission control unit configured to output the transmission data to the communication unit;

a first area determination unit configured to determine whether the first vehicle is located in an intersection area; and an operation mode determination unit configured to determine either a control mode or a terminal mode as an operation mode of the radio terminal device based on the identification information and a determination result by the first area determination unit, wherein, when the operation mode of the radio terminal device is determined to be the control mode, the transmission control unit is configured to output, as the transmission data, a second communication frame including second control information to the communication unit, and wherein, when the operation mode of the radio terminal device is determined to be the terminal mode, the transmission control unit is configured to output the transmission data to the communication unit in synchronization with the first communication frame including the first control information.

2. The semiconductor device according to claim 1, wherein, when the determination result by the first area determination unit indicates that the first vehicle is located in the intersection area, the operation mode determination unit is configured to determine whether the first communication frame is transmitted from a radio control device based on the identification information included in the first control information.

3. The semiconductor device according to claim 2, wherein, when determining that the first communication frame is transmitted from the radio control device, the operation mode determination unit is configured to determine the terminal mode as the operation mode of the radio terminal device.

4. The semiconductor device according to claim 2, wherein, when determining that the first communication frame is not transmitted from the radio control device, the operation mode determination unit is configured to determine the control mode as the operation mode of the radio terminal device.

5. The semiconductor device according to claim 1, wherein, when the determination result by the first area determination unit indicates that the first vehicle is not located in the intersection area, the operation mode determination unit is configured to determine the terminal mode as the operation mode of the radio terminal device.

6. The semiconductor device according to claim 1, wherein the first area determination unit is configured to determine whether the first vehicle is located in the intersection area based on position information of the first vehicle and map information.

7. The semiconductor device according to claim 1, wherein the transmission control unit comprises a timer, and is configured to add, into the transmission data, a count value of the timer when transmission processing of the transmission data is performed.

8. The semiconductor device according to claim 1, wherein the transmission control unit is configured to add, into the transmission data, identification information for identifying the radio terminal device.

9. The semiconductor device according to claim 1, wherein the circuitry is further configured to function as a second area determination unit configured to determine, based on position information of a radio control device included in the first control information, position information of the first vehicle and map information, whether the radio control device is installed at a same intersection as an intersection including the intersection area where the first vehicle is located.

10. The semiconductor device according to claim 9, wherein, when a determination result by the second area determination unit indicates that the radio control device is installed at the same intersection as the intersection including the intersection area where the first vehicle is located, the operation mode determination unit is configured to determine the terminal mode as the operation mode of the radio terminal device.

11. The semiconductor device according to claim 9, wherein, when a determination result by the second area determination unit indicates that the radio control device is not installed at the same intersection as the intersection including the intersection area where the first vehicle is located, the operation mode determination unit is configured to determine the control mode as the operation mode of the radio terminal device.

12. The semiconductor device according to claim 1, wherein the circuitry is further configured to function as a third area determination unit configured to determine, based on position information of a second vehicle included in the first control information, position information of the first vehicle and map information, whether the second vehicle is located at a same intersection as an intersection including the intersection area where the first vehicle is located, and wherein a radio terminal device mounted on the second vehicle operates in the control mode.

13. The semiconductor device according to claim 12, wherein, when a determination result by the third area determination unit indicates that the second vehicle is located at the same intersection as the intersection including the intersection area where the first vehicle is located, the operation mode determination unit is configured to determine the terminal mode as the operation mode of the radio terminal device mounted on the first vehicle.

14. The semiconductor device according to claim 12, wherein, when a determination result by the third area determination unit indicates that the second vehicle is not located at the same intersection as the intersection including the intersection area where the first vehicle is located, the operation mode determination unit determines the control mode as the operation mode of the radio terminal device mounted on the first vehicle.

15. The semiconductor device according to claim 1,
wherein the reception control unit comprises a control information extraction unit configured to extract the first control information from the reception data, and
wherein the transmission control unit is configured to:
generate the second control information; and
generate the second communication frame including the second control information.

16. A radio terminal device comprising:
the semiconductor device according to claim 1; and
a radio frequency unit coupled between the semiconductor device and an antenna.

17. A semiconductor device for controlling a radio terminal device mounted on a first vehicle, the semiconductor device comprising:
circuitry configured to function as:

a communication unit configured to receive a first communication frame to generate reception data, and transmit transmission data;

a reception control unit configured to extract first control information from the reception data, the first control information including identification information for identifying a radio communication device transmitting the first communication frame;

a first area determination unit configured to determine whether the first vehicle is located in an intersection area;

an operation mode determination unit configured to determine either a control mode or a terminal mode as an operation mode of the radio terminal device based on the identification information and a determination result by the first area determination unit; and a transmission control unit configured to perform first transmission processing or second transmission processing in accordance with the operation mode of the radio terminal device, wherein, when the operation mode of the radio terminal device is determined to be the control mode, the transmission control unit is configured to perform the first transmission processing of outputting, as the transmission data, a second communication frame including second control information to the communication unit, and wherein, when the operation mode of the radio terminal device is determined to be the terminal mode, the transmission control unit is configured to perform the second transmission processing of outputting the transmission data to the communication unit in synchronization with the first communication frame including the first control information.

18. A communication method of a radio terminal device mounted on a first vehicle, the communication method comprising:

receiving a first communication frame via an antenna;

generating reception data from the first communication frame;

storing the reception data in storage;

extracting first control information from the reception data, the first control information including identification information for identifying a radio communication device transmitting the first communication frame;

acquiring position information of the first vehicle via a global positioning system module;

determining whether the first vehicle is located in an intersection area based on the position information of the first vehicle and map information;

confirming the identification information;

determining either a control mode or a terminal mode as an operation mode of the radio terminal device mounted on the first vehicle based on the identification information and a result determined by the determining; and transmitting transmission data, wherein the transmitting comprises:

outputting, as the transmission data, a second communication frame including second control information when the operation mode of the radio terminal device mounted on the first vehicle is determined to be the control mode; and outputting the transmission data in synchronization with the first communication frame including the first control information when the operation mode of the radio terminal device mounted on the first vehicle is determined to be the terminal mode.

19. The communication method according to claim 18, further comprising:

confirming position information of a radio control device included in the first control information; and determining whether the radio control device is installed at a same intersection as an intersection including the intersection area where the first vehicle is located, based on the position information of the radio control device, the position information of the first vehicle and the map information.

20. The communication method according to claim 18, further comprising:

confirming position information of a second vehicle included in said first control information; and determining whether the second vehicle is located at a same intersection as an intersection including the intersection area where the first vehicle is located, based on the position information of the second vehicle, the position information of the first vehicle and the map information, wherein a radio terminal device mounted on the second vehicle operates in the control mode.

* * * * *